United States Patent
You

(10) Patent No.: US 9,442,271 B2
(45) Date of Patent: Sep. 13, 2016

(54) IMAGING LENS UNIT

(71) Applicant: SAMSUNG ELECTRO-MECHANICS CO., LTD., Suwon-si (KR)

(72) Inventor: Ho Sik You, Seongnam-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 14/169,121

(22) Filed: Jan. 30, 2014

(65) Prior Publication Data

US 2014/0146402 A1    May 29, 2014

Related U.S. Application Data

(63) Continuation of application No. 13/434,980, filed on Mar. 30, 2012, now Pat. No. 8,773,780.

(30) Foreign Application Priority Data

Oct. 10, 2011 (KR) .................. 10-2011-0103101

(51) Int. Cl.
*G02B 9/60* (2006.01)
*G02B 13/00* (2006.01)
*G02B 13/04* (2006.01)

(52) U.S. Cl.
CPC .............. *G02B 9/60* (2013.01); *G02B 13/0045* (2013.01); *G02B 13/04* (2013.01)

(58) Field of Classification Search
USPC .................................................. 359/763, 764
See application file for complete search history.

(56) References Cited

U.S. PATENT DOCUMENTS

| | | | |
|---|---|---|---|
| 7,502,181 B2 | 3/2009 | Shinohara | |
| 8,358,474 B2 * | 1/2013 | Kwon ............... | G02B 13/0045 359/764 |
| 8,395,851 B2 | 3/2013 | Tang et al. | |
| 2010/0253829 A1 | 10/2010 | Shinohara | |
| 2013/0208174 A1 | 8/2013 | Tamura | |
| 2013/0335622 A1 | 12/2013 | Kwon | |

FOREIGN PATENT DOCUMENTS

| | | |
|---|---|---|
| JP | 2007-298572 | 11/2007 |
| JP | 2010-256608 A | 11/2010 |
| KR | 10-2010-0043667 | 4/2010 |
| KR | 10-2011-0071554 | 6/2011 |
| WO | 2010-024198 | 3/2010 |

OTHER PUBLICATIONS

Office Action issued for related Korean Patent Application No. 10-2011-0103101, dated Jan. 21, 2013, and its English summary provided by the clients.

(Continued)

*Primary Examiner* — Jack Dinh
(74) *Attorney, Agent, or Firm* — NSIP Law

(57) ABSTRACT

Disclosed herein is an imaging lens unit, including: a first lens having a positive (+) power; a second lens having a negative (−) power; a third lens having power; a fourth lens having a negative (−) power; and a fifth lens having a negative (−) power, wherein the first lens, the second lens, the third lens, the fourth lens, and fifth lens are arranged in order from an object to be formed as an image, and the fourth lens is convex toward an image side.

26 Claims, 18 Drawing Sheets

(56) References Cited

OTHER PUBLICATIONS

Office Action dated Sep. 3, 2013 for related U.S. Appl. No. 13/434,980.
Office Action dated Feb. 8, 2013 for related U.S. Appl. No. 13/434,980.
Office Action dated Jan. 29, 2014 for related U.S. Appl. No. 13/434,980.
Office Action dated Jan. 29, 2014 for related U.S. Appl. No. 14/106,578.
U.S. Office Action issued on Dec. 18, 2015 in counterpart U.S. Appl. No. 14/473,938 (12 pages).

* cited by examiner

IMAGING LENS UNIT

CROSS REFERENCE TO RELATED APPLICATION

The present application is a continuation in part of, and claims the benefit of U.S. patent application Ser. No. 13/434,980, filed on Mar. 30, 2012, entitled "Image Lens Unit", which claims the benefit of Korean Patent Application No. 10-2011-0103101, filed on Oct. 10, 2011, entitled "Image Lens Unit", which is hereby incorporated by reference in its entirety into this application.

BACKGROUND OF THE INVENTION

1. Technical Field

The present invention relates to an imaging lens unit

2. Description of the Related Art

Recently, due to the advancement in technology, mobile terminals such as mobile phones and personal digital assistants (PDAs) are currently used for not only making simple phone calls but to also perform functions for multi-convergence such as playing music or movies, watching TV, and playing games. One of the leading factors for such multi-convergence is a camera module.

In general, a compact camera module (CCM) has a compact size and is applied to portable mobile communication devices such as camera phones, PDAs, and smartphones and various information technology (IT) devices such as toy cameras. Presently, CCMs are being installed in various devices in order to meet demands of consumers having specific preferences As the CCMs have to perform various functions using a compact optical system, various techniques are used to make the modules slim. In addition to the slim size, demands for image quality of the compact optical system are also increasing, and thus development of slim optical system providing a high image quality is required.

Thus, recently, an imaging lens unit constituting a high resolution imaging lens by using five lenses having positive (+) refractive power and negative (−) refractive power has been developed.

However, the imaging lens unit having five lenses described above cannot provide normal optical characteristics or aberration characteristics as desired by users according to predetermined conditions.

SUMMARY OF THE INVENTION

The present invention has been made in an effort to provide an imaging lens unit having five lenses and satisfying conditions of optical characteristics desired by users and showing excellent aberration characteristics.

According to a first preferred embodiment of the present invention, there is provided an imaging lens unit, including: a first lens having a positive (+) power; a second lens having a negative (−) power; a third lens having positive (+) or negative (−) power; a fourth lens having a negative (−) power; and a fifth lens having a negative (−) power, wherein the first lens, the second lens, the third lens, the fourth lens, and fifth lens are arranged in order from an object to be formed as an image, and the fourth lens is convex toward an image side.

The fourth lens may be a meniscus-shaped lens.

An Abbe number v4 of the fourth lens may satisfy the following conditional expression:

$0<v4<30.$

The second lens and the fourth lens may be formed of a high dispersion material.

An Abbe number v1 of the first lens may satisfy the following conditional expression:

$50<v1.$

An Abbe number v2 of the second lens may satisfy the following conditional expression:

$0<v2<30.$

The first lens may have a convex form toward an object side.

The second lens may have a concave form toward the image side.

The fifth lens may have an inflection point toward the image side.

The third lens may have negative (−) power.

The third lens may have positive (+) power.

The imaging lens unit may further include an aperture stop disposed in front of the first lens to adjust a light amount.

The imaging lens unit may further include an aperture stop disposed between the first lens and the second lens to adjust a light amount The first lens, the second lens, the third lens, and the fourth lens may all be made of a plastic material.

A curvature radius r7 of the fourth lens at the object side, and a curvature radius r8 of the fourth lens at the image side may satisfy the following conditional expression:

$(r7+r8)/(r7-r8)<-2.5.$

A total focal length f of the imaging lens unit and a distance tt from a vertex of the first lens at the object side to the image side may satisfy the following conditional expression:

$0<tt/f<1.3.$

An Abbe number v1 of the first lens, an Abbe number v2 of the second lens, an Abbe number v3 of the third lens, and an Abbe number v4 of the fourth lens may satisfy the following conditional expression:

$0.7<(v1+v2)/(v3+v4)\leq1.2.$

The sum f12 of focal lengths of the first lens and the second lens and a total focal length f of the imaging lens unit may satisfy the following conditional expression: $0.7<f12/f<1.4.$ A focal length f2 of the second lens and a total focal length f of the imaging lens unit may satisfy the following conditional expression: $-1.6<f2/f<-0.8.$ A curvature radius r4 of the second lens at the image side and a total focal length f of the imaging lens unit may satisfy the following conditional expression: $0.3<r4/f<1.0.$ A refractive index n2 of the second lens may satisfy the following conditional expression: $1.58<n2<1.75.$ A distance d456 from the second lens at the image side to the fourth lens at the object side on the optical axis and a total focal length f of the imaging lens unit may satisfy the following conditional expression: $0.6<d456/f<1.6.$ An Abbe number v1 of the first lens and an Abbe number v2 of the second lens may satisfy the following conditional expression: $25<v1-v2<40.$ A distance tt from a vertex of the first lens at the object side to the image side and an imaged height (a diagonal length of an effective image surface) 2Y may satisfy the following conditional expression: $0.68<tt/2Y<1.05.$ A semi-angle of view (a maximum angle of light incident to an optical system) ω may satisfy the following conditional expression: 29≤ω≤39.

A distance TTL from an incident surface of the first lens at the object side to the image side and a total focal length F of the imaging lens unit may satisfy the following conditional expression: 1.0≤TTL/f≤1.3.

A total focal length f of the imaging lens unit may satisfy the following conditional expression: 1.4≤f≤2.8.

A curvature radius r1 of the first lens at the image side and a total focal length f of the imaging lens unit may satisfy the following conditional expression: 0.3<r1/f<0.45.

A total focal length f of the imaging lens unit and a focal length f5 of the fifth lens may satisfy the following conditional expression: −0.8<f/f5<0.02.

BRIEF DESCRIPTION OF THE DRAWINGS

The patent or application file contains at least one drawing executed in color. Copies of this patent or patent application publication with color drawing(s) will be provided by the U.S. Patent and Trademark Office upon request and payment of the necessary fee.

DESCRIPTION OF THE PREFERRED EMBODIMENTS

Figure 1:
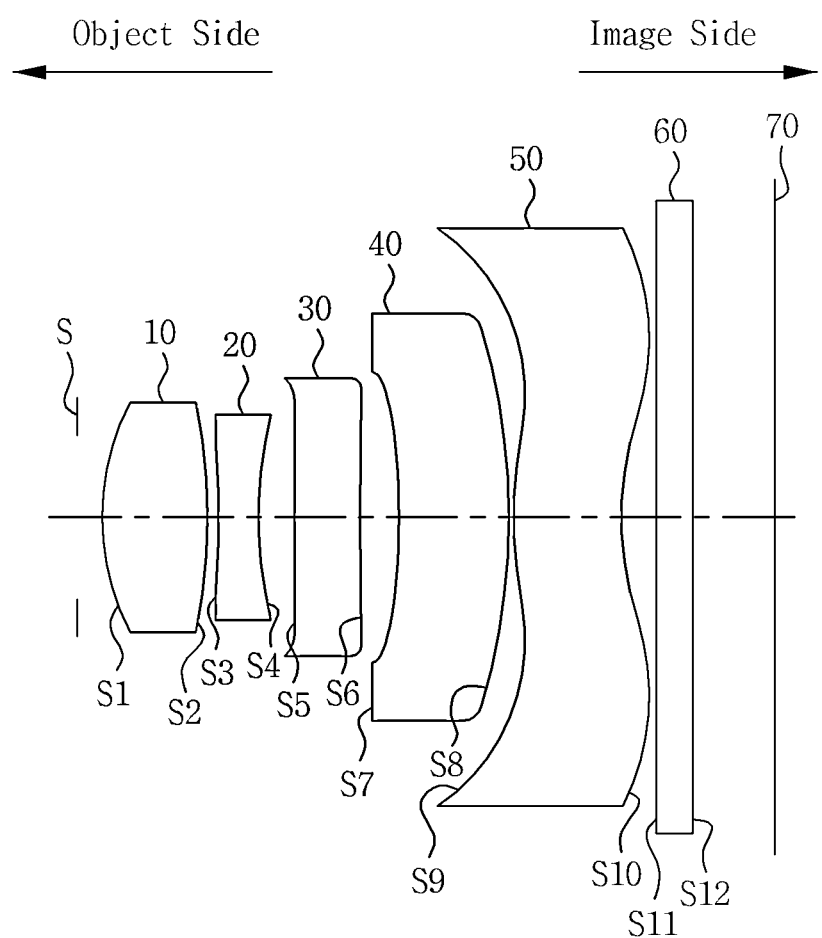
FIG. 1 is a cross-sectional view schematically illustrating an internal structure of an imaging lens unit according to a first preferred embodiment of the present invention.

The above and other objects, features and advantages of the present invention will be more clearly understood from the following detailed description taken in conjunction with the accompanying drawings. In the specification, in adding reference numerals to components throughout the drawings, it is to be noted that like reference numerals designate like components even though components are shown in different drawings. In the description, the terms "first", "second", "one surface", "the other surface" and so on are used to distinguish one element from another element, and the elements are not defined by the above terms. In describing the present invention, a detailed description of related known functions or configurations will be omitted so as not to obscure the gist of the present invention.

Hereinafter, preferred embodiments of the present invention will be described in detail with reference to the accompanying drawings.

First Preferred Embodiment

FIG. 1 is a cross-sectional view schematically illustrating an internal structure of an imaging lens unit according to a first preferred embodiment of the present invention. As illustrated in FIG. 1, the imaging lens unit according to the first preferred embodiment of the present invention includes, in order from an object side of an object, which is to be formed as an image, a first lens 10, a second lens 20, a third lens 30, a fourth lens 40, a fifth lens 50, a filter 60, and an image sensor 70.

Also, an aperture stop S that adjusts a light amount of incident light that is incident from the object to be formed as an image and a focal depth may be disposed toward the object side to be separated a predetermined distance from the first lens 10.

Accordingly, the light amount of the object to be imaged passes through each of the first lens 10, the second lens 20, the third lens 30, the fourth lens 40, and the fifth lens 50 to be incident on the image sensor 70.

Also, the filter 60 may be formed of an ultraviolet ray blocking filter (IR cut filter), that prevents ultraviolet rays emitted from the incident light that is incident therethrough from being transmitted to the image sensor 70 disposed at an image side.

In detail, the first lens 10 has positive (+) power, and the second lens 20 has negative (−) power, the third lens 30 has negative (−) power, the fourth lens 40 has negative (−) power, and the fifth lens 50 has negative (−) power.

Also, the first lens 10 is convex toward the object side, and an Abbe number v1 of the first lens 10 satisfies the following conditional expression:

50<v1.     Conditional expression (1):

Also, the second lens 20 is concave toward the image side, and an Abbe number v2 of the second lens 20 satisfies the following conditional expression:

$$0<v2<30. \quad \text{Conditional expression (2):}$$

Also, the fourth lens 40 is convex toward the image side and has a meniscus shape, and an Abbe number v4 of the fourth lens 40 satisfies the following conditional expression:

$$0<v4<30. \quad \text{Conditional expression (3):}$$

Also, the fifth lens 50 has an inflection point toward the image side.

In addition, the second lens 20 and the fourth lens 40 are made of a high dispersion material.

The imaging lens unit according to the first preferred embodiment of the present invention illustrated in FIG. 1 satisfies the above-described conditional expressions (1), (2), and (3), and also satisfies the following conditional expressions, thus providing excellent aberration characteristics and high resolving power.

$$(r7+r8)/(r7-r8)<-2.5 \quad \text{Conditional expression (4):}$$

$$0<tt/f<1.3 \quad \text{Conditional expression (5):}$$

$$0.7<(v1+v2)/(v3+v4)\le1.2 \quad \text{Conditional expression (6):}$$

Here, the symbols denote the following:
f: total focal length of the imaging lens unit
r7: curvature radius of the fourth lens 40 at the object side
r8: curvature radius of the fourth lens 40 at the image side
tt: distance from a vertex of the first lens 10 at the object side to the image side
v1: Abbe number of the first lens 10
v2: Abbe number of the second lens 20
v3: Abbe number of the third lens 30
v4: Abbe number of the fourth lens 40

Also, aspheric constants of the imaging lens unit according to the first preferred embodiment of the present invention may be obtained using Equation 1 below.

$$Z(h) = \frac{ch^2}{1+\sqrt{1-(1+k)c^2h^2}} + Ah^4 + Bh^6 + Ch^8 + Dh^{10} + Eh^{12} + Fh^{14} \quad [\text{Equation 1}]$$

Z: distance from a vertex of a lens to an optical axis direction
c: basic curvature of a lens
h: distance from a vertex of a lens to a direction perpendicular to the optical axis
K: Conic constant
A, B, C, D, E, F: aspheric constants Here, the alphabet E used with a conic constant K or with an aspheric constant A, B, C, D, E, or F and a number connected to the alphabet E by a hyphen "-" denote the involution of 10.

For example, "E+01" denotes $10^1$, and "E−01" denotes $10^{-1}$.

Table 1 below shows design data of the lenses of the imaging lens unit according to the first preferred embodiment of the present invention.

TABLE 1

| Lens number | Lens surface number | Curvature radius (mm) | Thickness (mm) | Index | Abbe number |
|---|---|---|---|---|---|
| First lens | S1 | 1.763 | 0.900 | 1.534 | 56.200 |
| | S2 | −5.672 | 0.063 | | |
| Second lens | S3 | −9.198 | 0.364 | 1.614 | 25.600 |
| | S4 | 4.163 | 0.308 | | |
| Third lens | S5 | 14.875 | 0.551 | 1.534 | 56.200 |
| | S6 | 11.495 | 0.305 | | |
| Fourth lens | S7 | −4.748 | 0.900 | 1.614 | 25.600 |
| | S8 | −5.587 | 0.058 | | |
| Fifth lens | S9 | 2.809 | 0.900 | 1.534 | 56.200 |
| | S10 | 1.784 | 0.300 | | |
| Filter | S11 | 000 | 0.300 | 1.517 | 64.200 |
| | S12 | 000 | 0.713 | | |

As shown in Table 1, an Abbe number v1 of the first lens 10 according to the first preferred embodiment of the present invention is 56.200, thus satisfying Conditional expression (1).

Also, an Abbe number v2 of the second lens 20 is 25.600, thus satisfying Conditional expression (2).

Also, an Abbe number v4 of the fourth lens 40 is 25.600, thus satisfying Conditional expression (3).

In addition, it can be seen from a curvature radius of the fourth lens 40 that Conditional expression (4) is satisfied.

In addition, it can be seen from the Abbe numbers of the first lens 10, the second lens 20, and the fourth lens 40 that Conditional expression (6) is satisfied.

Table 2 below shows aspheric constants of the lenses of the imaging lens unit according to the first preferred embodiment of the present invention.

TABLE 2

| Lens number | Lens surface number | K | A | B | C | D | E | F |
|---|---|---|---|---|---|---|---|---|
| First lens | S1 | −1.0691E+00 | 1.2819E−02 | −1.2774E−02 | 7.1902E−03 | −1.9070E−02 | | |
| | S2 | −3.6984E+01 | −7.3735E−03 | −7.9849E−02 | 2.3367E−02 | 2.6266E−03 | | |
| Second lens | S3 | 0.0000E+00 | 7.4005E−02 | −7.3221E−02 | 1.9838E−02 | 2.5006E−02 | | |
| | S4 | 1.4763E+01 | 2.4962E−02 | 1.1805E−02 | −1.7987E−02 | 1.0340E−02 | | |
| Third lens | S5 | 0.0000E+00 | −6.9792E−02 | −7.6877E−03 | 3.2156E−02 | −3.1754E−02 | | |
| | S6 | 0.0000E+00 | 6.8123E−03 | −8.2799E−02 | 5.8992E−02 | −2.0776E−02 | | |
| Fourth lens | S7 | −1.0154E+02 | −1.1014E−03 | −1.7923E−02 | −6.7548E−02 | 5.6115E−02 | −1.8166E−02 | |
| | S8 | −7.9624E+00 | 3.4197E−02 | −3.3333E−02 | 7.9714E−03 | −6.9532E−04 | 1.0098E−05 | |
| Fifth lens | S9 | −1.0389E+01 | −9.0596E−02 | 2.2209E−02 | −3.7819E−03 | 5.0937E−04 | −4.6163E−05 | |
| | S10 | −6.3248E+00 | −4.9536E−02 | 1.1043E−02 | −1.9780E−03 | 1.9725E−04 | −9.8808E−06 | |

Below, Table 3 shows focal lengths (Focal Length Tolerance, EFL) of the lenses of the imaging lens unit according to the first preferred embodiment of the present invention, and according to the above conditional expressions.

TABLE 3

| Lens number | Focal length |
|---|---|
| First lens | 2.629 |
| Second lens | −4.619 |
| Third lens | −100.407 |
| Fourth lens | −87.132 |
| Fifth lens | −13.178 |
| Ass'y | 4.9455 |

As shown in Table 3, it can be seen from the focal length of the first lens 10 according to the first preferred embodiment of the present invention that Conditional expression (5) is satisfied.

In addition, according to the first preferred embodiment of the present invention, the sum f12 of the focal lengths of the first lens 10 and the second lens 20 and the total focal length f of the imaging lens unit may satisfy the following conditional expression:

$$0.7 < f12/f < 1.4.$$  Conditional expression (7):

The above-described conditional expression (7) is satisfied, thereby making it possible to allow the imaging lens unit to have excellent optical characteristics.

In addition, according to the first preferred embodiment of the present invention, the focal length f2 of the second lens 20 and the total focal length f of the imaging lens unit may satisfy the following conditional expression:

$$-1.6 < f2/f < -0.8.$$  Conditional expression (8):

The above-described conditional expression (8) is satisfied, thereby making it possible to effectively correct chromatic aberration.

In addition, according to the first preferred embodiment of the present invention, the curvature radius r4 of the second lens 20 at the image side and the total focal length f of the imaging lens unit may satisfy the following conditional expression:

$$0.3 < r4/f < 1.0.$$  Conditional expression (9):

The above-described conditional expression (9) is satisfied, thereby making it possible to secure a resolution by adjustment of a shape of an emitting surface of the second lens 20.

In addition, according to the first preferred embodiment of the present invention, a refractive index n2 of the second lens 20 may satisfy the following conditional expression:

$$1.58 < n2 < 1.75.$$  Conditional expression (10):

The above-described conditional expression (10) is a relationship expression for the refractive index of the second lens 20. The second lens 20 is made of a high dispersion material satisfying the above-described conditional expression (10), thereby making it possible to correct chromatic aberration.

In addition, according to the first preferred embodiment of the present invention, a distance d456 from the second lens 20 at the image side to the fourth lens 140 at the object side on the optical axis and the total focal length f of the imaging lens unit may satisfy the following conditional expression:

$$0.6 < d456/f < 1.6.$$  Conditional expression (11):

The above-described conditional expression (11) is a relationship expression for front and rear air distances from the third lens 30. The above-described conditional expression (11) is satisfied, thereby making it possible to form the imaging lens unit having excellent optical characteristics.

In addition, according to the first preferred embodiment of the present invention, the Abbe number v1 of the first lens 10 and the Abbe number v2 of the second lens 20 may satisfy the following conditional expression:

$$25 < v1-v2 < 40.$$  Conditional expression (12):

The above-described conditional expression (12) is satisfied, thereby making it possible to form the imaging lens unit that has good marketability, is capable of more easily securing optical performance, and is slim.

In addition, according to the first preferred embodiment of the present invention, the distance tt from the vertex of the first lens 10 at the object side to the image side and an imaged height (a diagonal length of an effective image surface) 2Y may satisfy the following conditional expression:

$$0.68 < tt/2Y < 1.05.$$  Conditional expression (13):

The above-described conditional expression (13) is satisfied, thereby making it possible to form the imaging lens unit that is slim.

In addition, according to the first preferred embodiment of the present invention, a semi-angle of view (a maximum angle of light incident to an optical system) ω may satisfy the following conditional expression:

$$29 \leq \omega \leq 39.$$  Conditional expression (14):

The above-described conditional expression (14) is satisfied, thereby making it possible to form the imaging lens unit that is slim and having a structure appropriate for a wide angle.

In addition, according to the first preferred embodiment of the present invention, a distance TTL from an incident surface of the first lens 10 at the object side to the image side and the total focal length F of the imaging lens unit may satisfy the following conditional expression:

$$1.0 \leq TTL/f \leq 1.3.$$  Conditional expression (15):

The above-described conditional expression (15) is a relationship expression of TTL and power of the imaging lens unit according to the first preferred of the present invention. The above-described conditional expression (15) is satisfied, thereby making it possible to form the image lens that has a telephoto form and is compact.

In addition, according to the first preferred embodiment of the present invention, the total focal length f of the imaging lens unit may satisfy the following conditional expression:

$$1.4 \leq f \leq 2.8.$$  Conditional expression (16):

The above-described conditional expression (16) is satisfied, thereby making it possible to form the imaging lens unit having a structure appropriate for a bright lens.

In addition, according to the first preferred embodiment of the present invention, the curvature radius r1 of the first lens 10 at the image side and the total focal length f of the imaging lens unit may satisfy the following conditional expression:

$$0.3 < r1/f < 0.45.$$  Conditional expression (17):

The above-described conditional expression (17) is satisfied, thereby making it possible to decrease sensitivity by adjustment of a shape of the first lens 10.

In addition, according to the first preferred embodiment of the present invention, the total focal length f of the imaging lens unit and the focal length f5 of the fifth lens 50 may satisfy the following conditional expression:

$-0.8<f/f5<0.02$.   Conditional expression (18):

The above-described conditional expression (18) is satisfied, thereby making it possible to effectively correct distortion and form the imaging lens unit in a telephoto structure.

Figure 2:
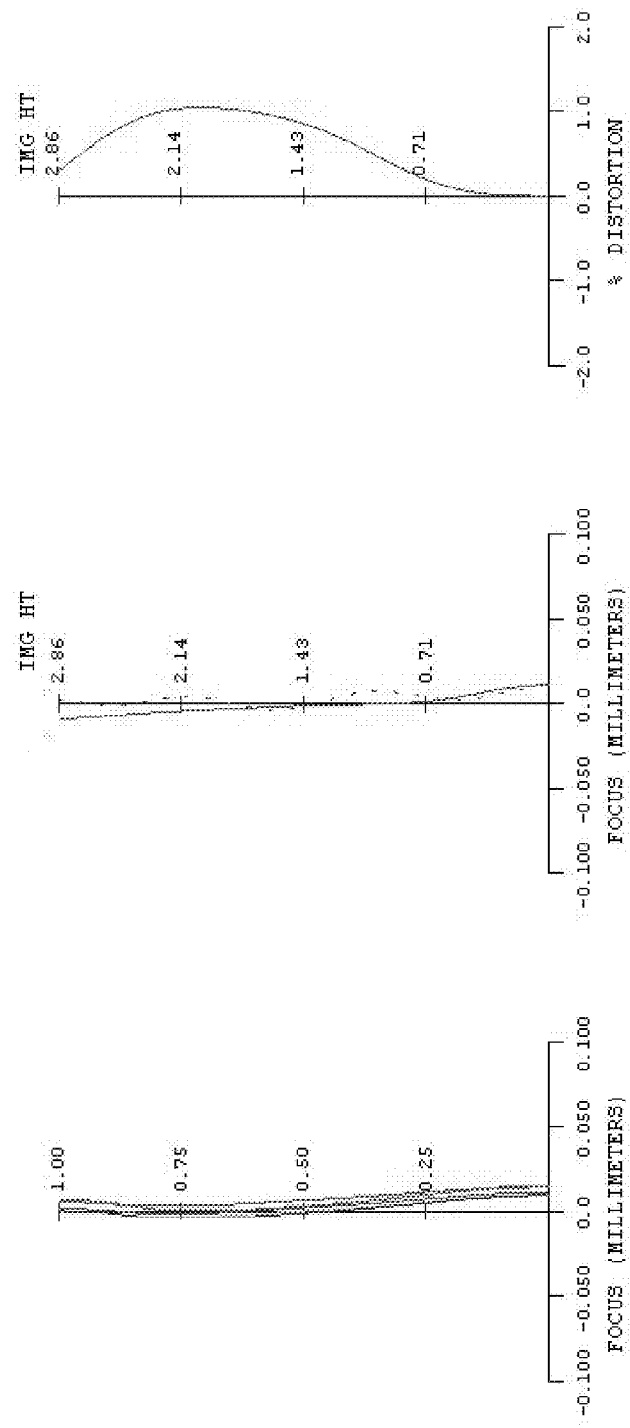
FIG. 2 is a graph showing aberrations of the imaging lens unit according to the first preferred embodiment of the present invention.

FIG. 2 is a graph showing aberrations of the imaging lens unit according to the first preferred embodiment of the present invention. As illustrated in FIG. 2, the graph shows longitudinal spherical aberration, astigmatic field curves, and distortion.

A Y-axis of the graph of FIG. 2 denotes an image height, and an X-axis denotes a focal length (unit: mm) and distortion (unit: %).

Also, with regard to interpretation of the graph of FIG. 2, it may be interpreted that the closer the curves of the graph are to the Y-axis, the better is an aberration correction function. Referring to the graph of FIG. 2, experimental data values measured according to the first preferred embodiment of the present invention are close to the Y-axis in almost all areas.

Accordingly, the imaging lens unit according to the first preferred embodiment of the present invention has excellent characteristics regarding spherical aberration, astigmatism, and distortion.

Figure 3:
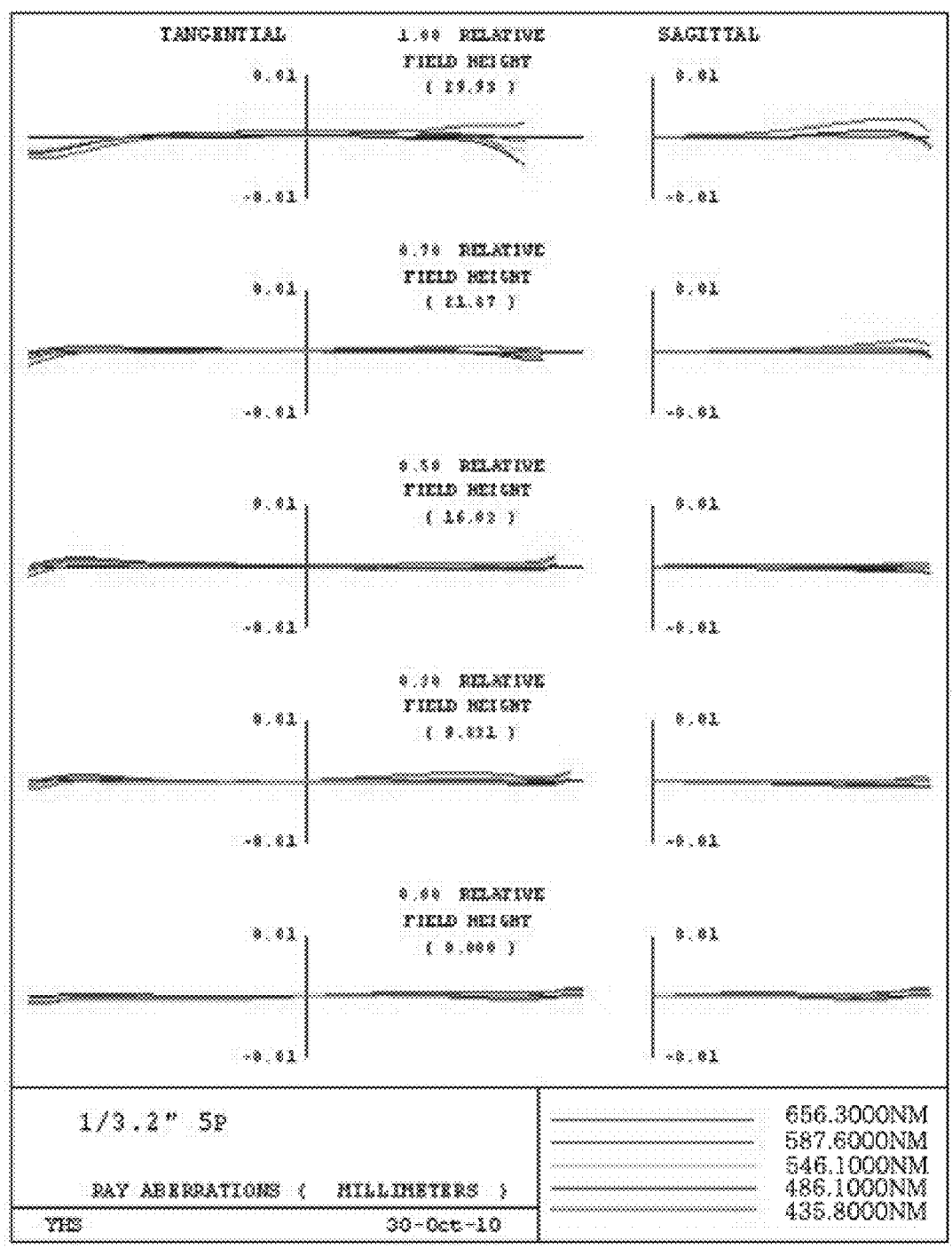
FIG. 3 is a graph showing coma aberration of the imaging lens unit according to the first preferred embodiment of the present invention.

FIG. 3 is a graph showing coma aberration of the imaging lens unit according to the first preferred embodiment of the present invention. As illustrated in FIG. 3, aberrations of tangential components and sagittal components of the imaging lens unit were measured according to a field height of an image plane.

With regard to interpretation of the graph of coma aberration, it may be interpreted that the closer the curves of the graph are to the X-axis on a positive axis and a negative axis, the better is the function of correcting coma aberration. Referring to the graph of FIG. 3, experimental data values measured according to the first preferred embodiment of the present invention are close to the X-axis in almost all areas.

Thus, the imaging lens unit according to the first preferred embodiment of the present invention provides an excellent coma aberration correction function.

Second Preferred Embodiment

Figure 4:
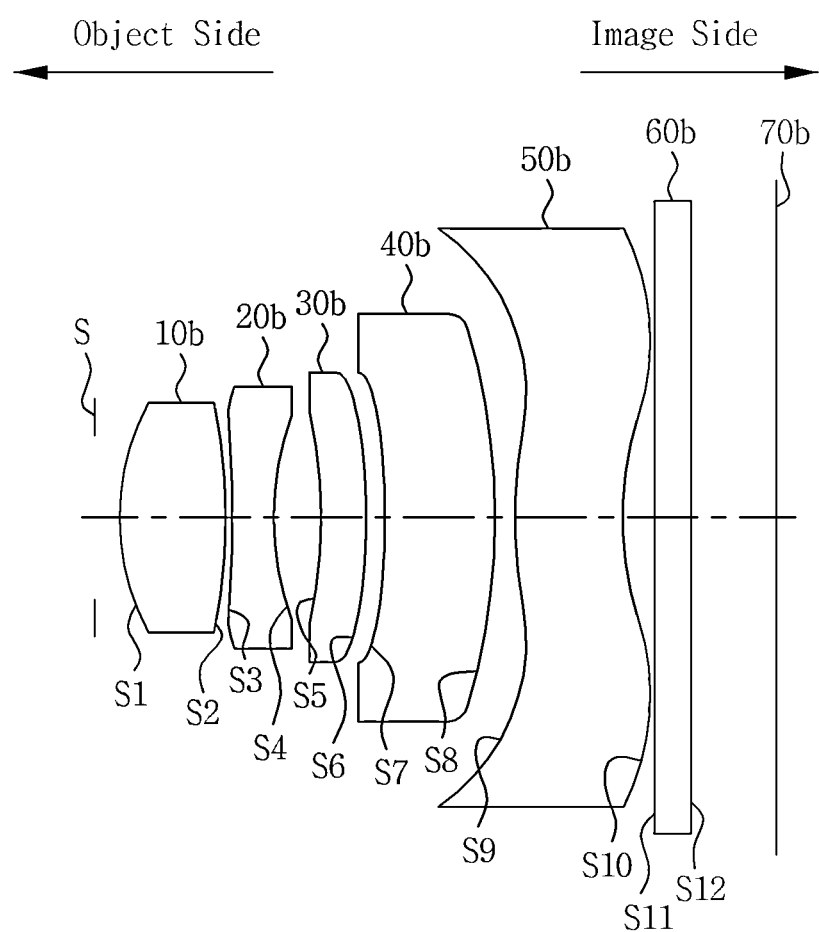
FIG. 4 is a cross-sectional view schematically illustrating an internal structure of an imaging lens unit according to a second preferred embodiment of the present invention.

FIG. 4 is a cross-sectional view schematically illustrating an internal structure of an imaging lens unit according to a second preferred embodiment of the present invention. Description of the same or corresponding elements to those of the previous preferred embodiment will be denoted with the same reference numerals, and description of repeated elements will be omitted. In regard to this, the imaging lens unit according to the second preferred embodiment of the present invention will be described hereinafter.

As illustrated in FIG. 4, the imaging lens unit according to the second preferred embodiment of the present invention includes, in order from an object side of an object which is to be formed as an image, a first lens 10b, a second lens 20b, a third lens 30b, a fourth lens 40b, a fifth lens 50b, a filter 60, and an image sensor 70.

In detail, the first lens 10b has positive (+) power, and the second lens 20b has negative (−) power, third lens 30b has positive (+) power, the fourth lens 40b has negative (−) power, and the fifth lens 50b has negative (−) power.

Also, the filter 60 and the image sensor 70 are arranged at the back of the fifth lens 50b.

Also, an aperture stop S that adjusts a light amount of incident light incident from an object to be formed as an image and a focal depth may be disposed toward the object side to be separated at a predetermined distance from the first lens 10b.

Table 4 below shows design data of the lenses of the imaging lens unit according to the second preferred embodiment of the present invention.

TABLE 4

| Lens number | Lens surface number | Curvature radius (mm) | Thickness (mm) | Index | Abbe number |
|---|---|---|---|---|---|
| First lens | S1 | 1.816 | 0.900 | 1.534 | 56.200 |
|  | S2 | −5.547 | 0.054 |  |  |
| Second lens | S3 | −97.166 | 0.400 | 1.614 | 25.600 |
|  | S4 | 2.856 | 0.361 |  |  |
| Third lens | S5 | −8.294 | 0.525 | 1.534 | 56.200 |
|  | S6 | −4.105 | 0.272 |  |  |
| Fourth lens | S7 | −2.584 | 0.900 | 1.614 | 25.600 |
|  | S8 | −3.098 | 0.150 |  |  |
| Fifth lens | S9 | 3.311 | 0.900 | 1.534 | 56.200 |
|  | S10 | 1.662 | 0.300 |  |  |
| Filter | S11 |  | 0.300 | 1.517 | 64.200 |
|  | S12 |  | 0.709 |  |  |

Table 5 below shows aspheric constants of the lenses of the imaging lens unit according to the second preferred embodiment of the present invention.

TABLE 5

| Lens number | Lens surface number | K | A | B | C | D | E | F |
|---|---|---|---|---|---|---|---|---|
| First lens | S1 | −1.0273E+00 | 1.3839E−02 | −9.1788E−03 | 8.0117E−03 | −1.4801E−02 |  |  |
|  | S2 | −2.9977E+01 | 1.6039E−02 | −7.8975E−02 | 1.8846E−02 | 2.9650E−04 |  |  |
| Second lens | S3 | 0.0000E+00 | 4.0689E−02 | −5.3059E−02 | −1.1937E−03 | 2.1356E−02 |  |  |
|  | S4 | 5.3062E+00 | −1.8141E−02 | 2.2376E−02 | −2.7022E−02 | 1.1053E−02 |  |  |
| Third lens | S5 | 0.0000E+00 | −3.5015E−02 | −2.0312E−02 | 3.5575E−02 | −2.2585E−02 |  |  |
|  | S6 | 0.0000E+00 | 5.6233E−02 | −1.2617E−01 | 7.4023E−02 | −2.0183E−02 |  |  |
| Fourth lens | S7 | −2.3140E+01 | 1.0244E−02 | −4.6689E−02 | −3.7693E−02 | 3.8980E−02 | −1.3645E−02 |  |
|  | S8 | −1.6824E+01 | 1.8939E−02 | −2.9754E−02 | 7.9458E−03 | −8.5824E−04 | 4.4694E−05 |  |
| Fifth lens | S9 | −1.2507E+00 | −1.0725E−01 | 2.3608E−02 | −3.6392E−03 | 4.5632E−04 | −2.9218E−05 |  |
|  | S10 | −6.5984E+00 | −3.9477E−02 | 7.0115E−03 | −1.0061E−03 | 6.4242E−05 | −1.6654E−06 |  |

Below, Table 6 shows focal lengths (Focal Length Tolerance, EFL) of the lenses of the imaging lens unit according to the second preferred embodiment of the present invention and according to the above conditional expressions.

TABLE 6

| Lens number | Focal length |
|---|---|
| First lens | 2.629 |
| Second lens | −4.512 |
| Third lens | 14.584 |
| Fourth lens | −75.715 |
| Fifth lens | −7.714 |
| Ass'y | 4.9479 |

Figure 5:
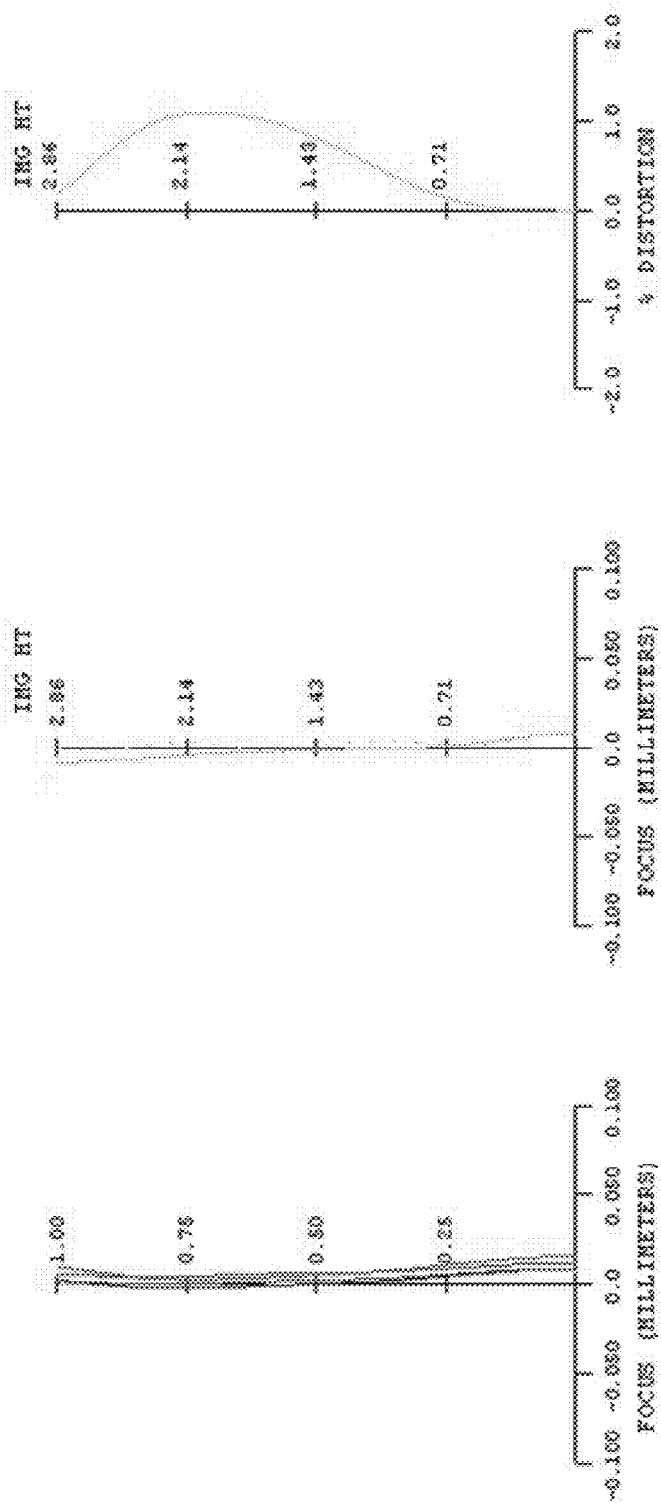
FIG. 5 is a graph showing aberrations of the imaging lens unit according to the second preferred embodiment of the present invention.

FIG. 5 is a graph showing aberrations of the imaging lens unit according to the second preferred embodiment of the present invention. As illustrated in FIG. 5, the graph shows longitudinal spherical aberration, astigmatic field curves, and distortion.

A Y-axis of the graph of FIG. 5 denotes an image height, and an X-axis denotes a focal length (unit: mm) and distortion (unit: %).

Also, with regard to interpretation of the graph of FIG. 5, it may be interpreted that the closer the curves of the graph are to the Y-axis, the better is an aberration correction function. Referring to the graph of FIG. 5, experimental data values measured according to the second preferred embodiment of the present invention are close to the Y-axis in almost all areas.

Accordingly, the imaging lens unit according to the second preferred embodiment of the present invention has excellent characteristics regarding spherical aberration, astigmatism, and distortion.

Figure 6:
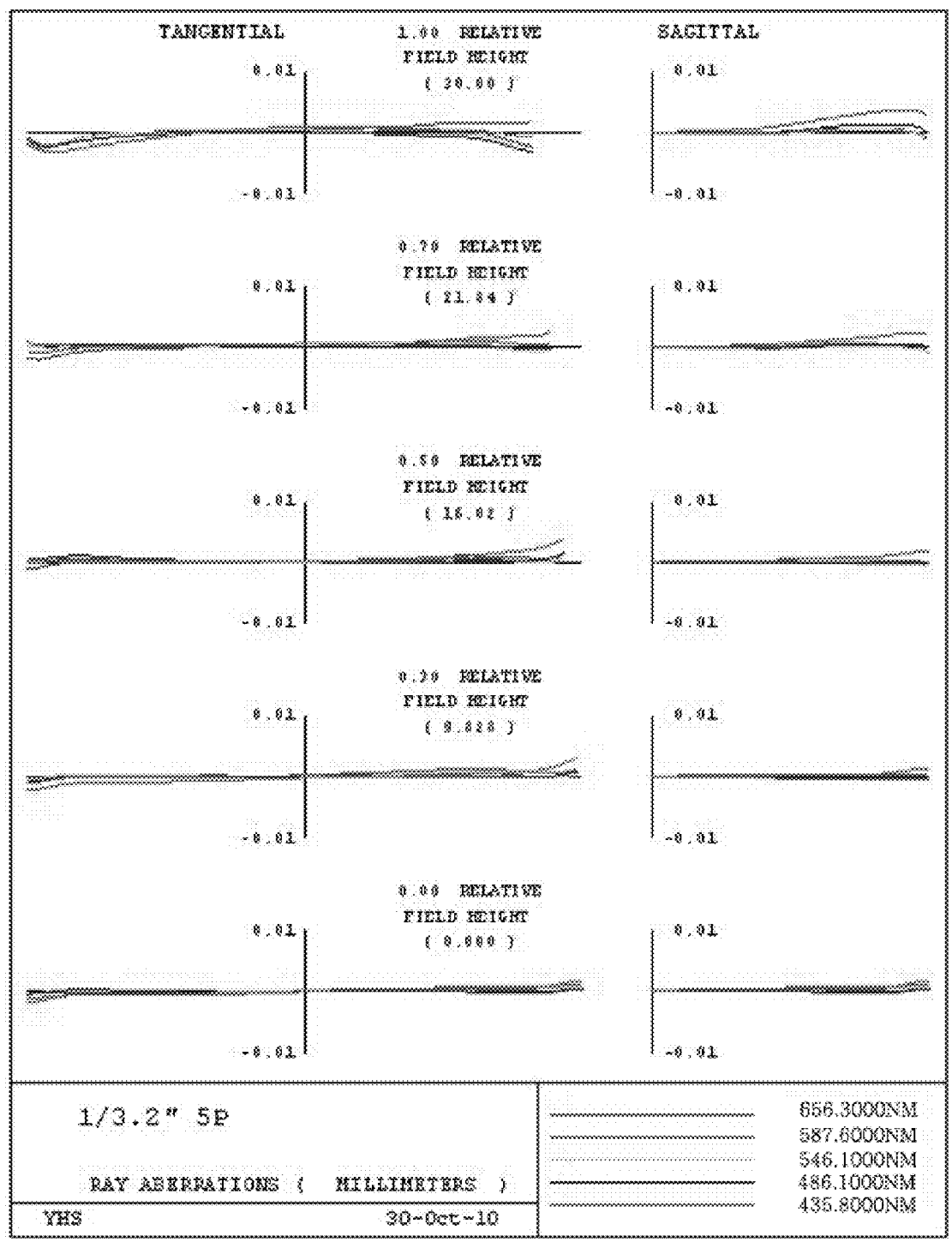
FIG. 6 is a graph showing coma aberration of the imaging lens unit according to the second preferred embodiment of the present invention.

FIG. 6 is a graph showing coma aberration of the imaging lens unit according to the second preferred embodiment of the present invention. As illustrated in FIG. 6, aberrations of tangential components and sagittal components of the imaging lens unit were measured according to a field height of an image plane.

With regard to interpretation of the graph of coma aberration, it may be interpreted that the closer the curves of the graph are to the X-axis on a positive axis and a negative axis, the better is the function of correcting coma aberration. Referring to the graph of FIG. 6, experimental data values measured according to the second preferred embodiment of the present invention are close to the X-axis in almost all areas.

Thus, the imaging lens unit according to the second preferred embodiment of the present invention provides an excellent coma aberration correction function.

Third Preferred Embodiment

Figure 7:
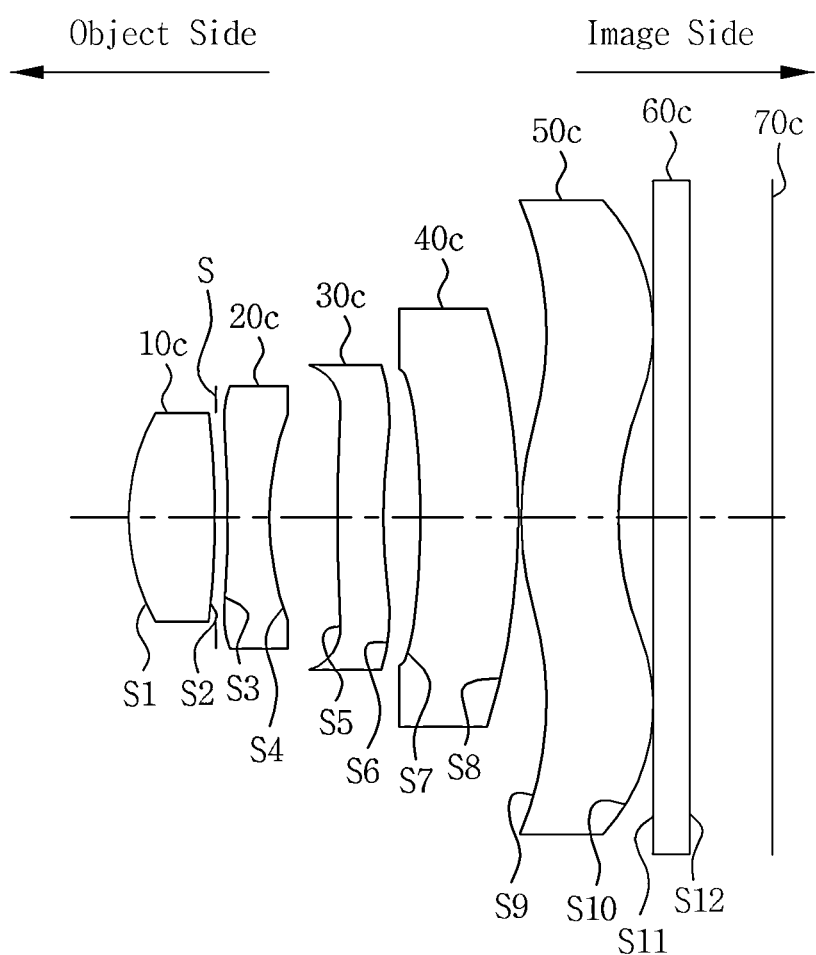
FIG. 7 is a cross-sectional view schematically illustrating an internal structure of an imaging lens unit according to a third preferred embodiment of the present invention.

FIG. 7 is a cross-sectional view schematically illustrating an internal structure of an imaging lens unit according to a third preferred embodiment of the present invention. Description of the same or corresponding elements to those of the previous preferred embodiments will be denoted with the same reference numerals, and description of repeated elements will be omitted. In regard to this, the imaging lens unit according to the third preferred embodiment of the present invention will be described hereinafter.

As illustrated in FIG. 7, the imaging lens unit according to the third preferred embodiment of the present invention includes, in order from an object side of an object which is to be formed as an image, a first lens 10c, a second lens 20c, a third lens 30c, a fourth lens 40c, a fifth lens 50c, a filter 60, and an image sensor 70.

In detail, the first lens 10c has positive (+) power, and the second lens 20c has negative (−) power, third lens 30c has negative (−) power, the fourth lens 40c has negative (−) power, and the fifth lens 50c has negative (−) power.

Also, an aperture stop S that adjusts a light amount of incident light incident from an object to be formed as an image and a focal depth may be disposed between the first lens 10c and the second lens 20c.

Also, the filter 60 and the image sensor 70 are arranged at the back of the fifth lens 50c.

Table 7 below shows design data of the lenses of the imaging lens unit according to the third preferred embodiment of the present invention.

TABLE 7

| Lens number | Lens surface number | Curvature radius (mm) | Thickness (mm) | Index | Abbe number |
|---|---|---|---|---|---|
| First lens | S1 | 1.730 | 0.752 | 1.534 | 56.200 |
|  | S2 | −8.569 | 0.050 |  |  |
| Aperture stop | S | INFINITY | 0.061 |  |  |
| Second lens | S3 | −13.180 | 0.400 | 1.614 | 25.600 |
|  | S4 | 3.528 | 0.620 |  |  |
| Third lens | S5 | 5.570 | 0.400 | 1.534 | 56.200 |
|  | S6 | 4.920 | 0.307 |  |  |
| Fourth lens | S7 | −4.191 | 0.900 | 1.614 | 25.600 |
|  | S8 | −5.275 | 0.050 |  |  |
| Fifth lens | S9 | 2.036 | 0.855 | 1.534 | 56.200 |
|  | S10 | 1.702 | 0.300 |  |  |
| Filter | S11 |  | 0.300 | 1.517 | 64.200 |
|  | S12 |  | 0.710 |  |  |

Table 8 below shows aspheric constants of the lenses of the imaging lens unit according to the third preferred embodiment of the present invention.

TABLE 8

| Lens number | Lens surface number | K | A | B | C | D | E | F |
|---|---|---|---|---|---|---|---|---|
| First lens | S1 | −9.4427E−01 | 1.5322E−02 | −8.2026E−03 | 9.9253E−03 | −1.7307E−02 |  |  |
|  | S2 | 5.7561E+00 | 2.3480E−03 | 7.0525E−03 | −4.8277E−02 | 1.8181E−02 |  |  |
| Aperture stop | S |  |  |  |  |  |  |  |
| Second lens | S3 | 0.0000E+00 | 2.5677E−02 | 3.7071E−02 | −6.9411E−02 | 4.4068E−02 |  |  |
|  | S4 | 8.7002E+00 | −6.2934E−04 | 4.2185E−02 | 4.2185E−02 | 3.0125E−02 |  |  |
| Third lens | S5 | 0.0000E+00 | −8.9747E−02 | −3.8532E−02 | 5.7459E−02 | −3.3302E−02 |  |  |
|  | S6 | 0.0000E+00 | −1.1576E−02 | −1.0527E−01 | 7.4150E−02 | −1.9678E−02 |  |  |
| Fourth lens | S7 | −7.0912E+01 | 4.3019E−02 | −3.8067E−02 | −4.4898E−02 | 4.3045E−02 | −1.0699E−02 |  |
|  | S8 | −2.0574E+01 | 3.9125E−02 | −3.4167E−02 | 8.2237E−03 | −6.7424E−04 | −8.5788E−06 |  |
| Fifth lens | S9 | −4.0068E+00 | −7.0899E−02 | 2.0161E−02 | −4.0410E−03 | 4.8831E−04 | −2.4990E−05 |  |
|  | S10 | −4.8559E+00 | −4.3280E−02 | 9.4989E−03 | −1.5821E−03 | 1.2507E−04 | −4.0178E−06 |  |

Table 9 below shows focal lengths (Focal Length Tolerance, EFL) of the lenses of the imaging lens unit according to the third preferred embodiment of the present invention and according to the above conditional expressions.

TABLE 9

| Lens number | Focal length |
|---|---|
| First lens | 2.766 |
| Second lens | −4.492 |
| Third lens | −100.348 |
| Fourth lens | −48.560 |
| Fifth lens | −180.664 |
| Ass'y | 4.9446 |

Figure 8:
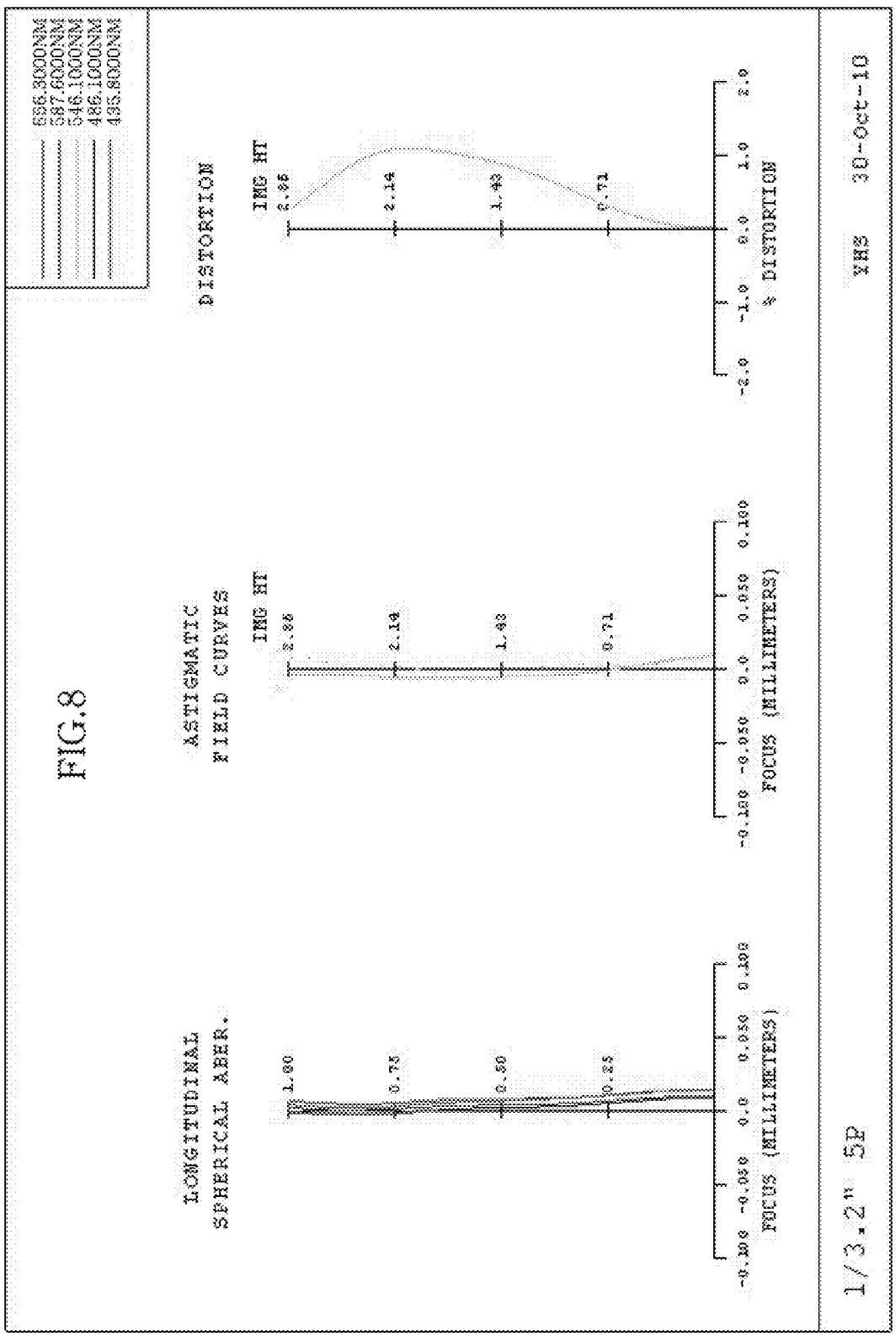
FIG. 8 is a graph showing aberrations of the imaging lens unit according to the third preferred embodiment of the present invention.

FIG. 8 is a graph showing aberrations of the imaging lens unit according to the third preferred embodiment of the present invention. As illustrated in FIG. 8, the graph shows longitudinal spherical aberration, astigmatic field curves, and distortion.

A Y-axis of the graph of FIG. 8 denotes an image height, and an X-axis denotes a focal length (unit: mm) and distortion (unit: %).

Also, with regard to interpretation of the graph of FIG. 8, it may be interpreted that the closer the curves of the graph are to the Y-axis, the better is an aberration correction function. Referring to the graph of FIG. 8, experimental data values measured according to the third preferred embodiment of the present invention are close to the Y-axis in almost all areas.

Accordingly, the imaging lens unit according to the third preferred embodiment of the present invention has excellent characteristics regarding spherical aberration, astigmatism, and distortion.

Figure 9:
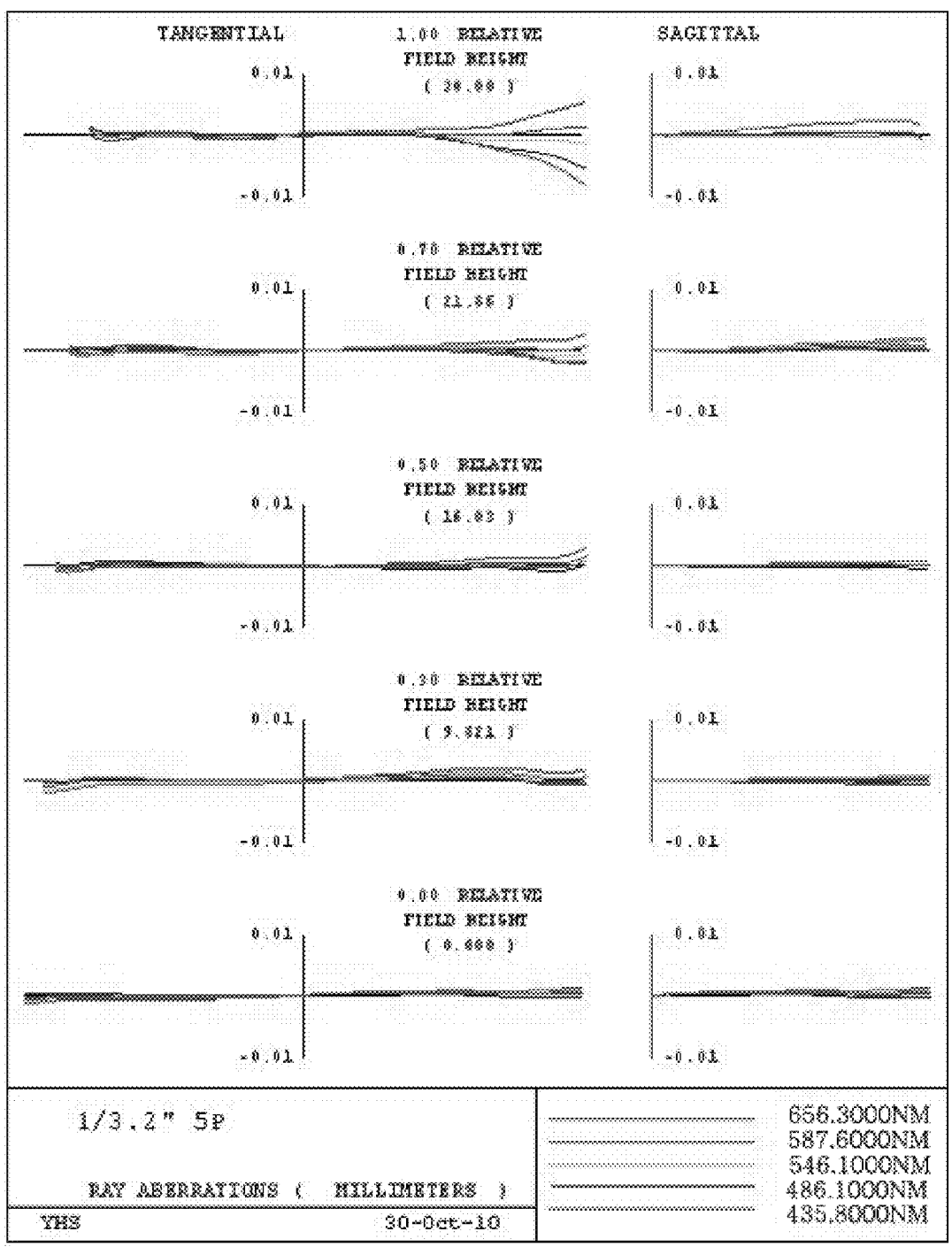
FIG. 9 is a graph showing coma aberration of the imaging lens unit according to the third preferred embodiment of the present invention.

FIG. 9 is a graph showing coma aberration of the imaging lens unit according to the third preferred embodiment of the present invention. As illustrated in FIG. 9, aberrations of tangential components and sagittal components of the imaging lens unit were measured according to a field height of an image plane.

With regard to interpretation of the graph of coma aberration, it may be interpreted that the closer the curves of the graph are to the X-axis on a positive axis and a negative axis, the better is the function of correcting coma aberration. Referring to the graph of FIG. 9, experimental data values measured according to the third preferred embodiment of the present invention are close to the X-axis in almost all areas.

Thus, the imaging lens unit according to the third preferred embodiment of the present invention provides an excellent coma aberration correction function.

Fourth Preferred Embodiment

Figure 10:
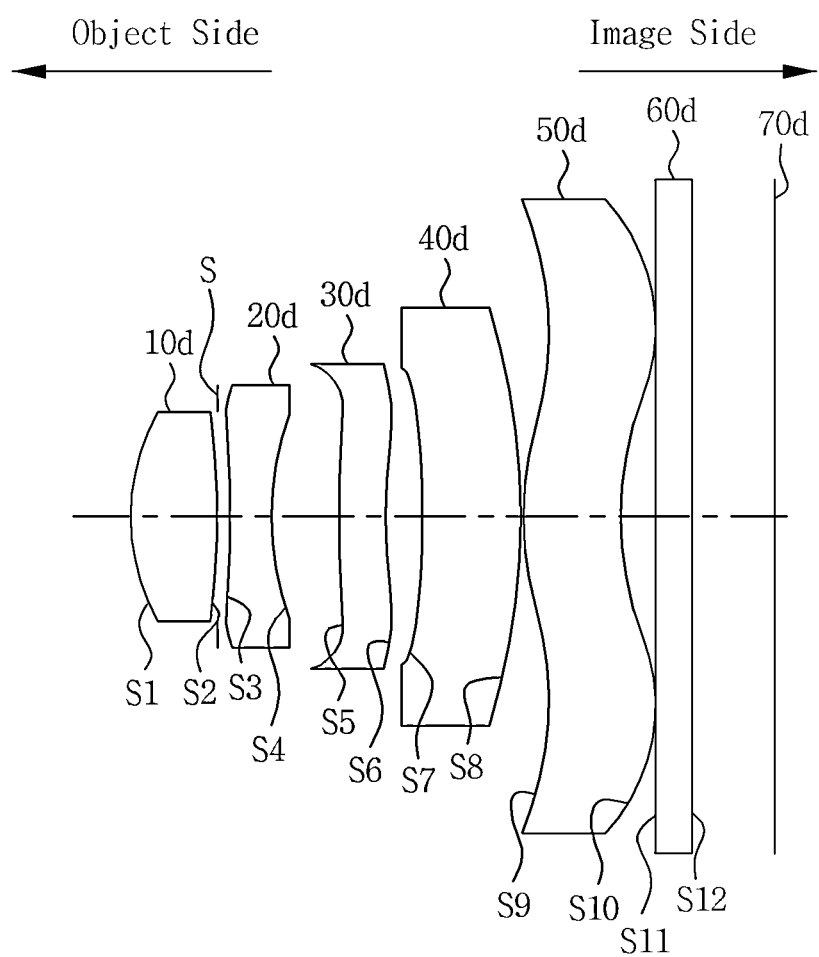
FIG. 10 is a cross-sectional view schematically illustrating an internal structure of an imaging lens unit according to a fourth preferred embodiment of the present invention.

FIG. 10 is a cross-sectional view schematically illustrating an internal structure of an imaging lens unit according to a fourth preferred embodiment of the present invention. Description of the same or corresponding elements to those of the previous preferred embodiment will be denoted with the same reference numerals, and description of repeated elements will be omitted. In regard to this, the imaging lens unit according to the fourth preferred embodiment of the present invention will be described hereinafter.

As illustrated in FIG. 10, the imaging lens unit according to the fourth preferred embodiment of the present invention includes, in order from an object side of an object which is to be formed as an image, a first lens 10e, a second lens 20e, a third lens 30e, a fourth lens 40e, a fifth lens 50e, a filter 60, and an image sensor 70.

In detail, the first lens 10e has positive (+) power, and the second lens 20e has negative (−) power, third lens 30e has positive (+) power, the fourth lens 40e has negative (−) power, and the fifth lens 50e has negative (−) power.

Also, an aperture stop S that adjusts a light amount of incident light incident from an object to be formed as an image and a focal depth may be disposed between the first lens 10e and the second lens 20e.

Also, the filter 60 and the image sensor 70 are arranged at the back of the fifth lens 50e.

Table 10 below shows design data of the lenses of the imaging lens unit according to the fourth preferred embodiment of the present invention.

TABLE 10

| Lens number | Lens surface number | Curvature radius (mm) | Thickness (mm) | Index | Abbe number |
|---|---|---|---|---|---|
| First lens | S1 | 1.649 | 0.692 | 1.534 | 56.200 |
|  | S2 | −17.857 | 0.050 |  |  |
| Aperture stop | S | INFINITY | 0.060 |  |  |
| Second lens | S3 | −33.464 | 0.400 | 1.614 | 25.600 |
|  | S4 | 3.069 | 0.660 |  |  |
| Third lens | S5 | 5.521 | 0.435 | 1.534 | 56.200 |
|  | S6 | 7.247 | 0.324 |  |  |
| Fourth lens | S7 | −2.864 | 0.838 | 1.614 | 25.600 |
|  | S8 | −3.554 | 0.050 |  |  |
| Fifth lens | S9 | 2.093 | 0.891 | 1.534 | 56.200 |
|  | S10 | 1.634 | 0.300 |  |  |
| Filter | S11 |  | 0.300 | 1.517 | 64.200 |
|  | S12 |  | 0.709 |  |  |

Table 11 below shows aspheric constants of the lenses of the imaging lens unit according to the fourth preferred embodiment of the present invention.

TABLE 11

| Lens number | Lens surface number | K | A | B | C | D | E | F |
|---|---|---|---|---|---|---|---|---|
| First lens | S1 | −7.3137E−01 | 2.1043E−02 | −2.1087E−03 | 1.4879E−02 | −1.3640E−02 |  |  |
|  | S2 | 6.3414E+01 | −9.2536E−03 | 4.0018E−02 | −5.2746E−02 | 1.1953E−02 |  |  |
| Aperture stop | S |  |  |  |  |  |  |  |
| Second lens | S3 | 0.0000E+00 | −2.5029E−02 | 8.3666E−02 | −9.5937E−02 | 4.0994E−02 |  |  |
|  | S4 | 6.3117E+00 | −3.3108E−02 | 6.4702E−02 | −6.4244E−02 | 3.3962E−02 |  |  |
| Third lens | S5 | 0.0000E+00 | −6.7692E−02 | 6.4702E−02 | 5.5436E−02 | −2.7922E−02 |  |  |
|  | S6 | 0.0000E+00 | 2.9193E−02 | −1.2470E−01 | 7.7632E−02 | −1.8549E−02 |  |  |
| Fourth lens | S7 | −3.3044E+01 | 5.9958E−02 | −4.7098E−02 | −3.3764E−02 | 3.5789E−02 | −8.7537E−03 |  |
|  | S8 | −2.4258E+01 | 4.0732E−02 | −3.4555E−02 | 8.3201E−03 | −6.6003E−04 | −1.1978E−05 |  |
| Fifth lens | S9 | −4.4930E+00 | −6.1268E−02 | 1.7272E−02 | −3.9021E−03 | 5.2804E−04 | −2.8354E−05 |  |
|  | S10 | −6.2953E+00 | −3.0681E−02 | 5.4197E−03 | −9.2536E−04 | 5.8930E−05 | −8.3315E−07 |  |

Below, Table 12 shows focal lengths (Focal Length Tolerance, EFL) of the lenses of the imaging lens unit according to the fourth preferred embodiment of the present invention and according to the above conditional expressions.

TABLE 12

| Lens number | Focal length |
| --- | --- |
| First lens | 2.863 |
| Second lens | −4.560 |
| Third lens | 39.909 |
| Fourth lens | −44.664 |
| Fifth lens | −43.002 |
| Ass'y | 4.9475 |

Figure 11:
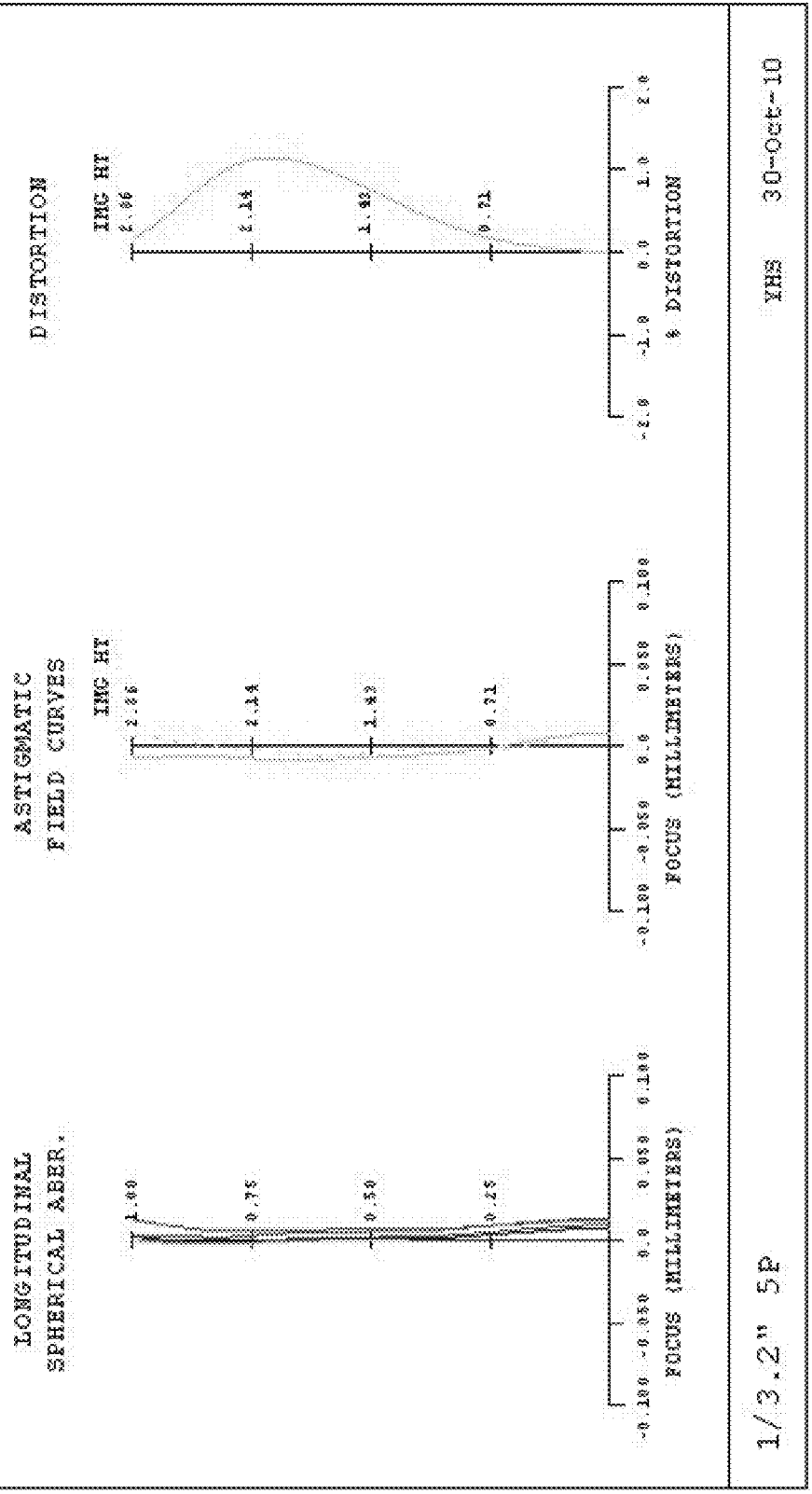
FIG. 11 is a graph showing aberrations of the imaging lens unit according to the fourth preferred embodiment of the present invention.

FIG. 11 is a graph showing aberrations of the imaging lens unit according to the fourth preferred embodiment of the present invention. As illustrated in FIG. 11, the graph shows longitudinal spherical aberration, astigmatic field curves, and distortion.

A Y-axis of the graph of FIG. 11 denotes an image height, and an X-axis denotes a focal length (unit: mm) and distortion (unit: %).

Also, with regard to interpretation of the graph of FIG. 11, it may be interpreted that the closer the curves of the graph are to the Y-axis, the better is an aberration correction function. Referring to the graph of FIG. 11, experimental data values measured according to the fourth preferred embodiment of the present invention are close to the Y-axis in almost all areas.

Accordingly, the imaging lens unit according to the fourth preferred embodiment of the present invention has excellent characteristics regarding spherical aberration, astigmatism, and distortion.

Figure 12:
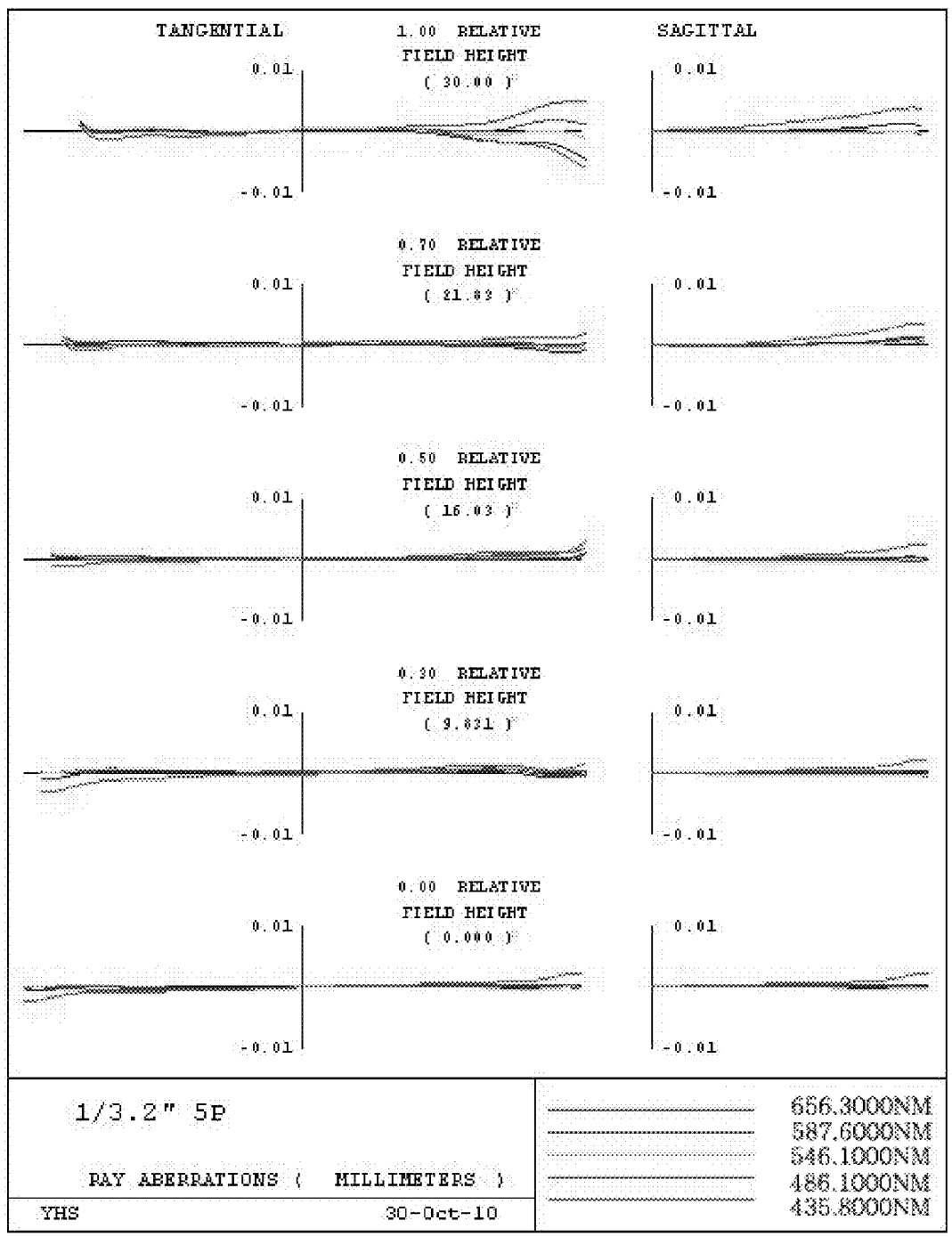
FIG. 12 is a graph showing coma aberration of the imaging lens unit according to the fourth preferred embodiment of the present invention.

FIG. 12 is a graph showing coma aberration of the imaging lens unit according to the fourth preferred embodiment of the present invention. As illustrated in FIG. 12, aberrations of tangential components and sagittal components of the imaging lens unit were measured according to a field height of an image plane.

With regard to interpretation of the graph of coma aberration, it may be interpreted that the closer the curves of the graph are to the X-axis on a positive axis and a negative axis, the better is the function of correcting coma aberration. Referring to the graph of FIG. 12, experimental data values measured according to the fourth preferred embodiment of the present invention are close to the X-axis in almost all areas.

Thus, the imaging lens unit according to the fourth preferred embodiment of the present invention provides an excellent coma aberration correction function.

Fifth Preferred Embodiment

Figure 13:
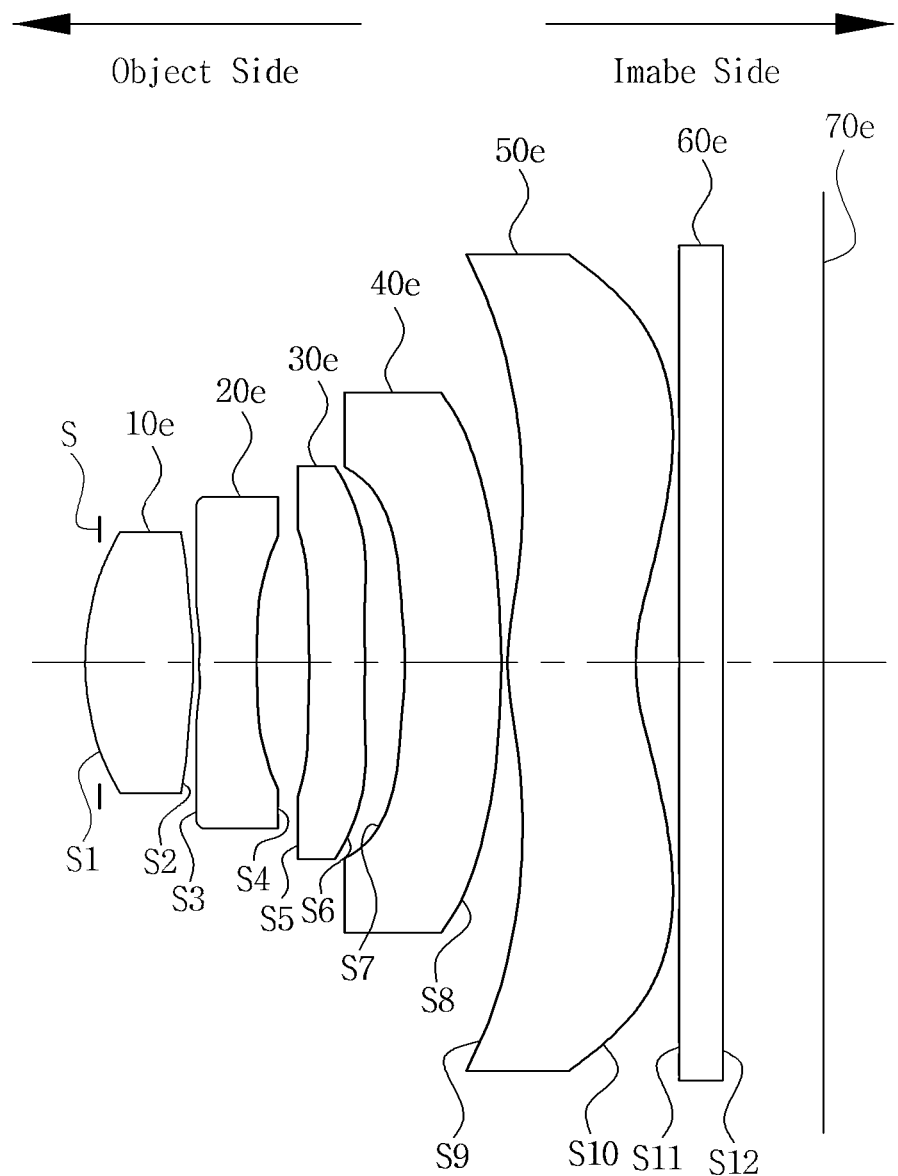
FIG. 13 is a cross-sectional view schematically illustrating an internal structure of an imaging lens unit according to a fifth Preferred embodiment of the present invention.

FIG. 13 is a cross-sectional view schematically illustrating an internal structure of an imaging lens unit according to a fifth Preferred Embodiment of the present invention. Description of the same or corresponding elements to those of the previous preferred embodiment will be denoted with the same reference numerals, and description of repeated elements will be omitted. In regard to this, the imaging lens unit according to the fifth Preferred Embodiment of the present invention will be described hereinafter.

As illustrated in FIG. 13, the imaging lens unit according to the fifth Preferred Embodiment of the present invention includes, in order from an object side of an object which is to be formed as an image, a first lens 10e, a second lens 20e, a third lens 30e, a fourth lens 40e, a fifth lens 50e, a filter 60, and an image sensor 70.

In detail, the first lens 10e has positive (+) power, and the second lens 20e has negative (−) power, third lens 30e has negative (−) power, the fourth lens 40e has negative (−) power, and the fifth lens 50e has negative (−) power.

Also, an aperture stop S that adjusts a light amount of incident light that is incident from the object to be formed as an image and a focal depth may be disposed toward the object side to be separated a predetermined distance from the first lens 10e.

Also, the filter 60 and the image sensor 70 are arranged at the back of the fifth lens 50e.

Table 13 below shows design data of the lenses of the imaging lens unit according to the Fifth Preferred Embodiment of the present invention.

TABLE 13

| Lens number | Lens surface number | Curvature radius (mm) | Thickness (mm) | Index | Abbe number |
| --- | --- | --- | --- | --- | --- |
| First lens | S1 | 1.596 | 0.739 | 1.534 | 56.2 |
| | S2 | −6.956 | 0.050 | | |
| Second lens | S3 | −13.916 | 0.400 | 1.614 | 25.6 |
| | S4 | 3.454 | 0.354 | | |
| Third lens | S5 | −91.741 | 0.400 | 1.534 | 56.2 |
| | S6 | 129.274 | 0.275 | | |
| Fourth lens | S7 | −3.249 | 0.682 | 1.614 | 25.6 |
| | S8 | −3.704 | 0.050 | | |
| Fifth lens | S9 | 2.171 | 0.900 | 1.534 | 56.2 |
| | S10 | 1.547 | 0.300 | | |
| Filter | S11 | | 0.300 | 1.517 | 64.2 |
| | S12 | | 0.716 | | |

Table 14 below shows aspheric constants of the lenses of the imaging lens unit according to the Fifth Preferred Embodiment of the present invention.

TABLE 14

| Lens number | Lens surface number | K | A | B | C | D | E | F |
| --- | --- | --- | --- | --- | --- | --- | --- | --- |
| First lens | S1 | −8.8738E−01 | 1.8383E−02 | −2.1585E−02 | 3.4599E−02 | −6.1081E−02 | | |
| | S2 | −6.6114E+01 | 6.9881E−03 | −1.2291E−01 | 1.3091E−02 | 7.8422E−03 | | |
| Second lens | S3 | 0.0000E+00 | 6.9103E−02 | −9.6684E−02 | −1.8818E−02 | 7.0782E−02 | | |
| | S4 | 9.9132E+00 | 1.7706E−02 | 3.8874E−02 | −6.6481E−02 | 5.3322E−02 | | |
| Third lens | S5 | 0.0000E+00 | −1.0456E−01 | 3.3534E−02 | 1.6009E−02 | −3.1398E−02 | | |
| | S6 | 0.0000E+00 | −2.4509E−02 | −9.3655E−02 | 7.5450E−02 | −2.1856E−02 | | |
| Fourth lens | S7 | −5.8800E+01 | 5.6186E−02 | −9.9522E−02 | −2.2127E−02 | 3.9292E−02 | −1.4385E−02 | |
| | S8 | −4.3948E+01 | 3.1114E−02 | −4.1568E−02 | 9.6509E−03 | −8.5055E−05 | −1.3667E−04 | |
| Fifth lens | S9 | −5.1910E+00 | −1.1746E−01 | 3.2607E−02 | −4.0898E−03 | 2.2266E−04 | −4.1412E−06 | |
| | S10 | −6.5108E+00 | −4.8051E−02 | 8.5534E−03 | −1.2154E−03 | 9.0155E−05 | −3.6973E−06 | |

Below, Table 15 shows focal lengths (Focal Length Tolerance, EFL) of the lenses of the imaging lens unit according to the Fifth Preferred Embodiment of the present invention and according to the above conditional expressions.

TABLE 15

| Lens number | Focal length |
|---|---|
| First lens | 2.507 |
| Second lens | −4.468 |
| Third lens | −100.424 |
| Fourth lens | −100.160 |
| Fifth lens | −20.223 |
| Ass'y | 4.4485 |

Figure 14:
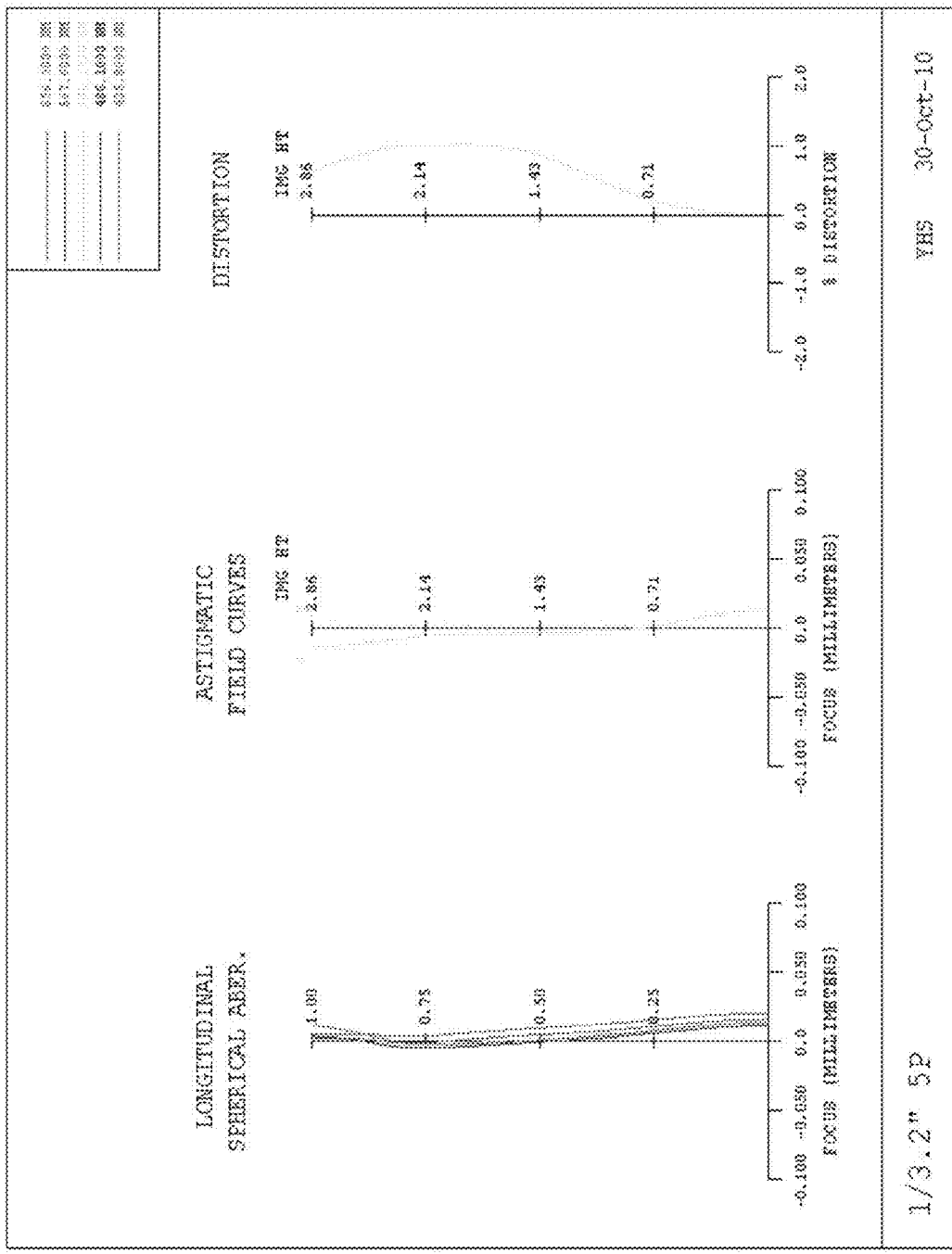
FIG. 14 is a graph showing aberrations of the imaging lens unit according to the fifth Preferred embodiment of the present invention.

FIG. 14 is a graph showing aberrations of the imaging lens unit according to the Fifth Preferred Embodiment of the present invention. As illustrated in FIG. 14, the graph shows longitudinal spherical aberration, astigmatic field curves, and distortion.

A Y-axis of the graph of FIG. 14 denotes an image height, and an X-axis denotes a focal length (unit: mm) and distortion (unit: %).

Also, with regard to interpretation of the graph of FIG. 14, it may be interpreted that the closer the curves of the graph are to the Y-axis, the better is an aberration correction function. Referring to the graph of FIG. 14, experimental data values measured according to the Fifth Preferred Embodiment of the present invention are close to the Y-axis in almost all areas.

Accordingly, the imaging lens unit according to the Fifth Preferred Embodiment of the present invention has excellent characteristics regarding spherical aberration, astigmatism, and distortion.

Figure 15:
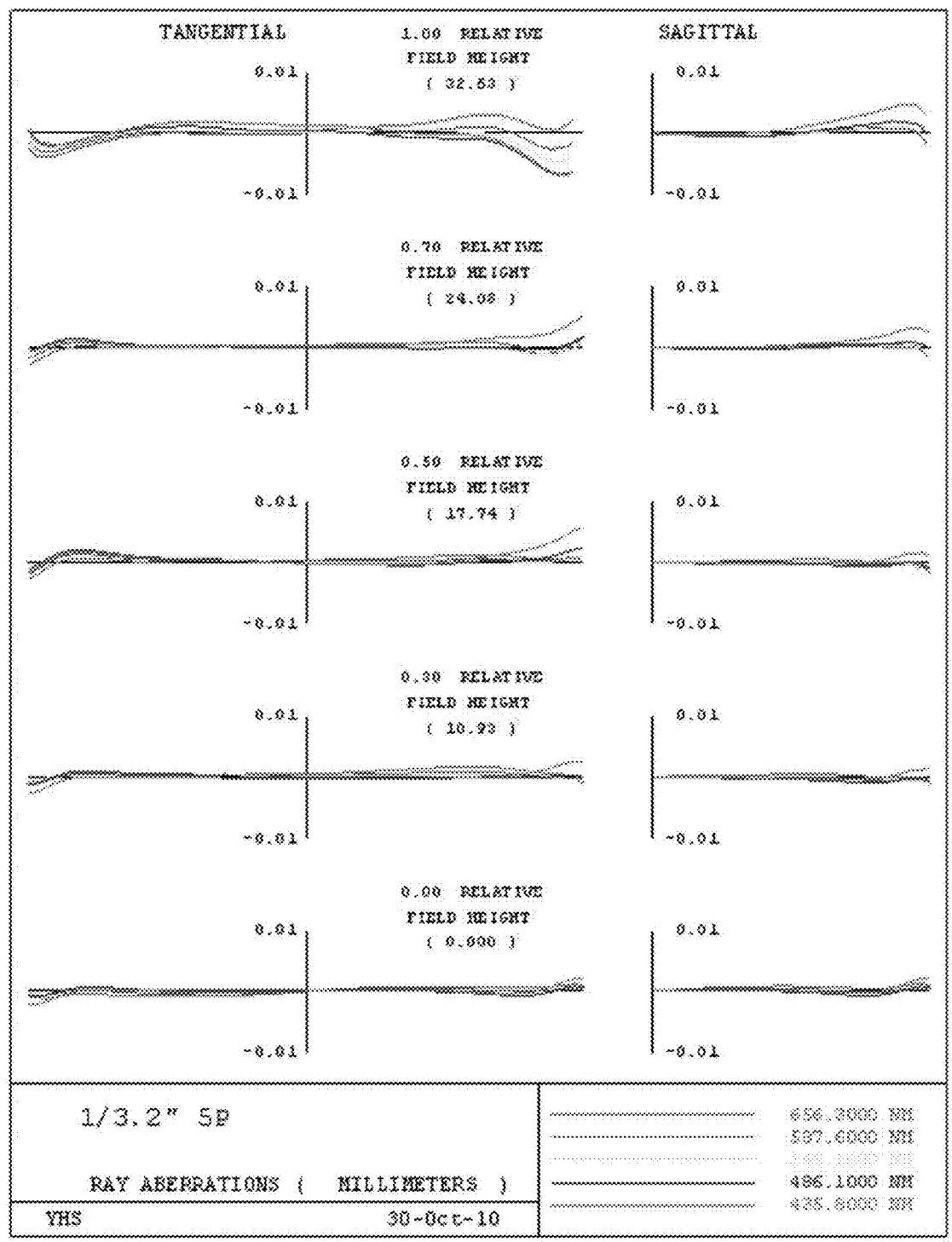
FIG. 15 is a graph showing coma aberration of the imaging lens unit according to the fifth Preferred embodiment of the present invention.

FIG. 15 is a graph showing coma aberration of the imaging lens unit according to the Fifth Preferred Embodiment of the present invention. As illustrated in FIG. 15, aberrations of tangential components and sagittal components of the imaging lens unit were measured according to a field height of an image plane.

With regard to interpretation of the graph of coma aberration, it may be interpreted that the closer the curves of the graph are to the X-axis on a positive axis and a negative axis, the better is the function of correcting coma aberration. Referring to the graph of FIG. 15, experimental data values measured according to the Fifth Preferred Embodiment of the present invention are close to the X-axis in almost all areas.

Thus, the imaging lens unit according to the Fifth Preferred Embodiment of the present invention provides an excellent coma aberration correction function.

Sixth Preferred Embodiment

Figure 16:
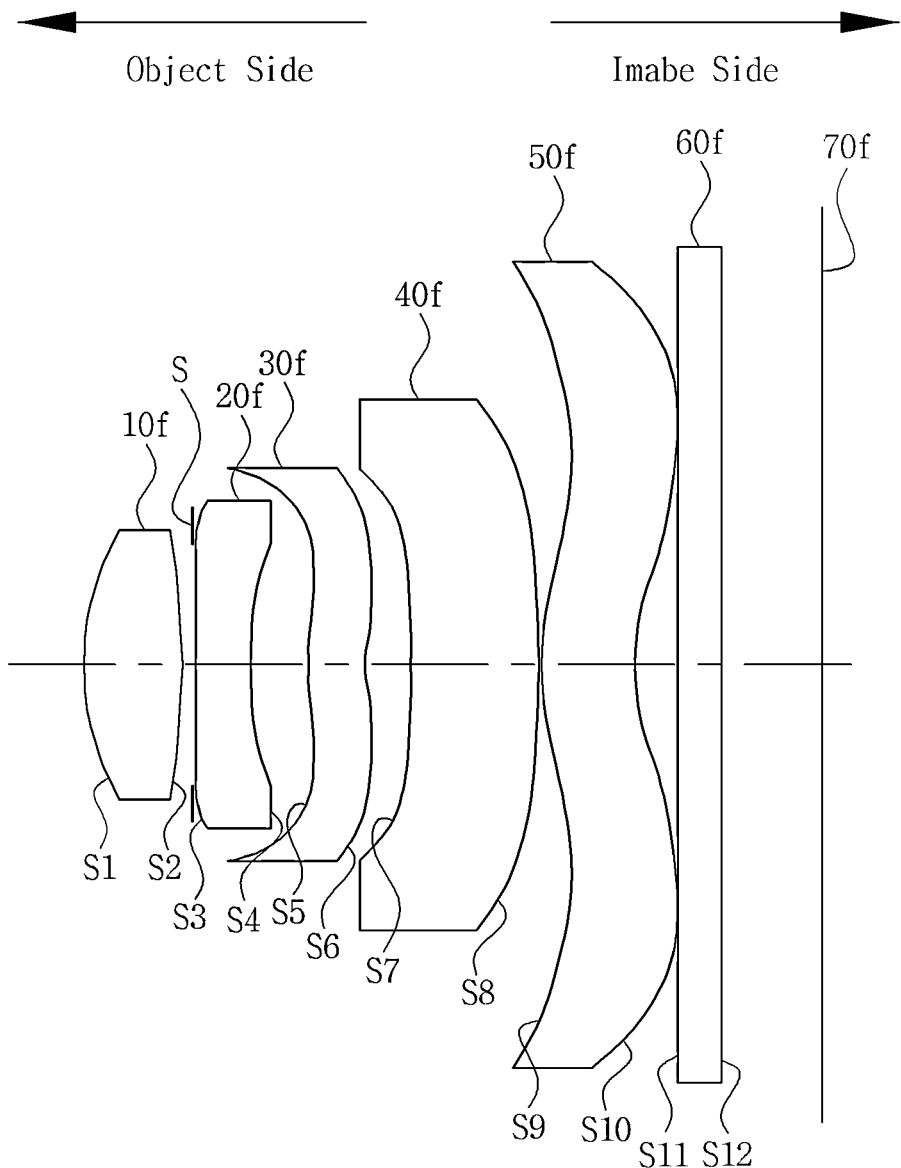
FIG. 16 is a cross-sectional view schematically illustrating an internal structure of an imaging lens unit according to a sixth Preferred embodiment of the present invention.

FIG. 16 is a cross-sectional view schematically illustrating an internal structure of an imaging lens unit according to a sixth Preferred Embodiment of the present invention. Description of the same or corresponding elements to those of the previous preferred embodiments will be denoted with the same reference numerals, and description of repeated elements will be omitted. In regard to this, the imaging lens unit according to the sixth Preferred Embodiment of the present invention will be described hereinafter.

As illustrated in FIG. 16, the imaging lens unit according to the sixth Preferred Embodiment of the present invention includes, in order from an object side of an object which is to be formed as an image, a first lens 10f, a second lens 20f, a third lens 30f, a fourth lens 40f, a fifth lens 50f, a filter 60, and an image sensor 70.

In detail, the first lens 10f has positive (+) power, and the second lens 20f has negative (−) power, third lens 30f has negative (−) power, the fourth lens 40f has negative (−) power, and the fifth lens 50f has negative (−) power.

Also, an aperture stop S that adjusts a light amount of incident light incident from an object to be formed as an image and a focal depth may be disposed between the first lens 10f and the second lens 20f.

Also, the filter 60 and the image sensor 70 are arranged at the back of the fifth lens 50f.

Table 16 below shows design data of the lenses of the imaging lens unit according to the sixth Preferred Embodiment of the present invention.

TABLE 16

| Lens number | Lens surface number | Curvature radius (mm) | Thickness (mm) | Index | Abbe number |
|---|---|---|---|---|---|
| First lens | S1 | 1.640 | 0.682 | 1.534 | 56.2 |
| | S2 | −8.234 | 0.050 | | |
| Aperture stop | S | INFINITY | 0.055 | | |
| Second lens | S3 | −14.096 | 0.400 | 1.614 | 25.6 |
| | S4 | 3.533 | 0.410 | | |
| Third lens | S5 | 7.118 | 0.400 | 1.534 | 56.2 |
| | S6 | 6.161 | 0.305 | | |
| Fourth lens | S7 | −4.614 | 0.887 | 1.614 | 25.6 |
| | S8 | −5.352 | 0.050 | | |
| Fifth lens | S9 | 1.699 | 0.661 | 1.534 | 56.2 |
| | S10 | 1.375 | 0.300 | | |
| Filter | S11 | | 0.300 | 1.517 | 64.2 |
| | S12 | | 0.714 | | |

Table 17 below shows aspheric constants of the lenses of the imaging lens unit according to the sixth Preferred Embodiment of the present invention.

TABLE 17

| Lens number | Lens surface number | K | A | B | C | D | E | F |
|---|---|---|---|---|---|---|---|---|
| First lens | S1 | −1.0483E+00 | 1.2631E−02 | −1.9755E−02 | 1.2597E−02 | −3.5973E−02 | | |
| | S2 | 1.4112E+01 | −3.7416E−03 | −8.0282E−03 | −4.5471E−02 | 1.3632E−02 | | |
| Aperture stop | S | | | | | | | |
| Second lens | S3 | 0.0000E+00 | 5.3665E−02 | 3.6551E−02 | −5.7784E−02 | 4.5325E−02 | | |
| | S4 | 9.0247E+00 | 2.0475E−02 | 6.7807E−02 | −7.4650E−02 | 6.1686E−02 | | |
| Third lens | S5 | 0.0000E+00 | −1.2193E−01 | −2.2005E−02 | 7.3917E−02 | −6.2284E−02 | | |
| | S6 | 0.0000E+00 | −5.6702E−02 | −9.5211E−02 | 7.3606E−02 | −2.2625E−02 | | |
| Fourth lens | S7 | −1.2195E+02 | 1.3333E−02 | −5.0139E−02 | −5.1072E−02 | 4.4143E−02 | −1.0953E−02 | |
| | S8 | −6.5026E+01 | 2.5074E−02 | −3.3943E−02 | 7.9627E−03 | −6.5855E−04 | 2.9345E−06 | |
| Fifth lens | S9 | −4.4012E+00 | −8.0562E−02 | 2.0923E−02 | −3.9704E−03 | 4.8088E−04 | −2.4947E−05 | |
| | S10 | −4.8353E+00 | −5.0673E−02 | 1.0074E−02 | −1.6464E−03 | 1.3496E−04 | −4.7044E−06 | |

Table 18 below shows focal lengths (Focal Length Tolerance, EFL) of the lenses of the imaging lens unit according to the sixth Preferred Embodiment of the present invention and according to the above conditional expressions.

TABLE 18

| Lens number | Focal length |
|---|---|
| First lens | 2.624 |
| Second lens | −4.562 |
| Third lens | −100.379 |
| Fourth lens | −100.439 |
| Fifth lens | −46.540 |
| Ass'y | 4.4835 |

Figure 17:
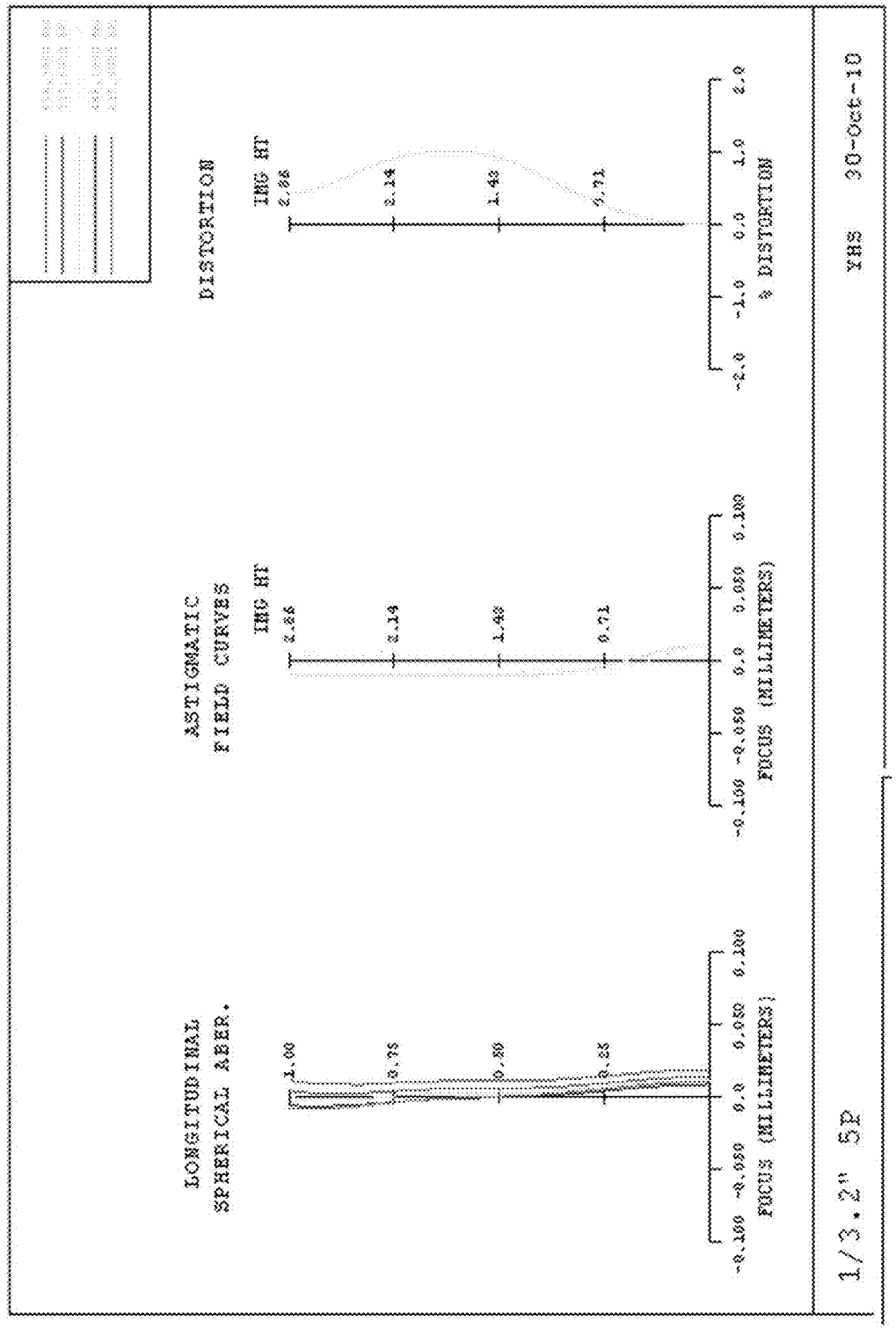
FIG. 17 is a graph showing aberrations of the imaging lens unit according to the sixth Preferred embodiment of the present invention.

FIG. 17 is a graph showing aberrations of the imaging lens unit according to the sixth Preferred Embodiment of the present invention. As illustrated in FIG. 17, the graph shows longitudinal spherical aberration, astigmatic field curves, and distortion.

A Y-axis of the graph of FIG. 17 denotes an image height, and an X-axis denotes a focal length (unit: mm) and distortion (unit: %).

Also, with regard to interpretation of the graph of FIG. 17, it may be interpreted that the closer the curves of the graph are to the Y-axis, the better is an aberration correction function. Referring to the graph of FIG. 17, experimental data values measured according to the sixth Preferred Embodiment of the present invention are close to the Y-axis in almost all areas.

Accordingly, the imaging lens unit according to the sixth Preferred Embodiment of the present invention has excellent characteristics regarding spherical aberration, astigmatism, and distortion.

Figure 18:
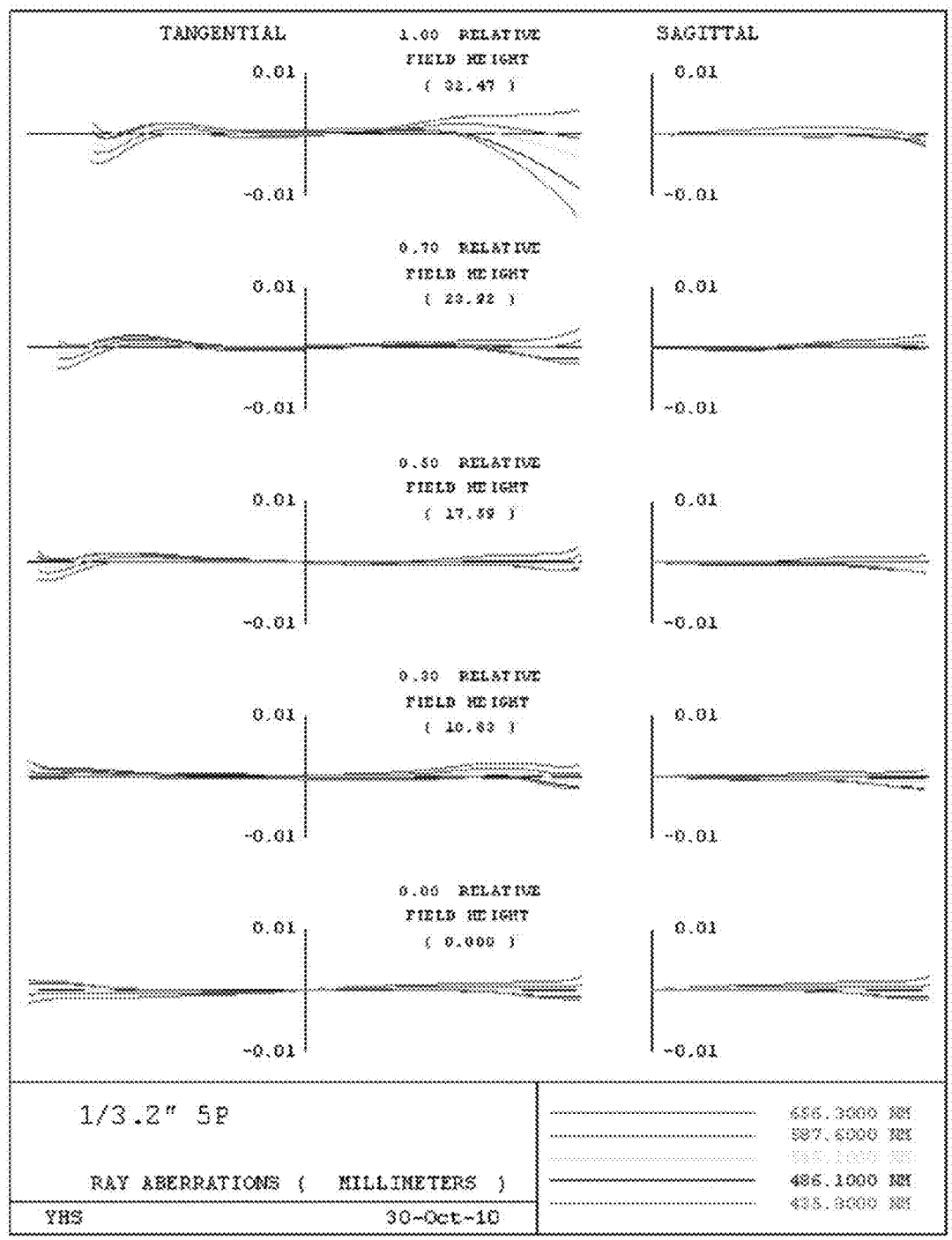
FIG. 18 is a graph showing coma aberration of the imaging lens unit according to the sixth Preferred embodiment of the present invention.

FIG. 18 is a graph showing coma aberration of the imaging lens unit according to the sixth Preferred Embodiment of the present invention. As illustrated in FIG. 18, aberrations of tangential components and sagittal components of the imaging lens unit were measured according to a field height of an image plane.

With regard to interpretation of the graph of coma aberration, it may be interpreted that the closer the curves of the graph are to the X-axis on a positive axis and a negative axis, the better is the function of correcting coma aberration. Referring to the graph of FIG. 18, experimental data values measured according to the sixth Preferred Embodiment of the present invention are close to the X-axis in almost all areas.

Thus, the imaging lens unit according to the sixth Preferred Embodiment of the present invention provides an excellent coma aberration correction function.

According to the preferred embodiments of the present invention, as the imaging lens unit including five lenses is provided, a compact optical system that is suitable for portable terminals, a compact camera module, and a high resolving power may be provided.

Although the preferred embodiment of the present invention has been disclosed for illustrative purposes, it will be appreciated that the imaging lens unit according to the invention is not limited thereto, and those skilled in the art will appreciate that various modifications, additions and substitutions are possible, without departing from the scope and spirit of the invention.

Accordingly, any and all modifications, variations or equivalent arrangements should be considered to be within the scope of the invention, and the detailed scope of the invention will be disclosed by the accompanying claims.

What is claimed is:

1. An imaging lens unit, comprising:
a first lens having positive (+) power;
a second lens having negative (−) power of which an object-side surface is concave;
a third lens having positive (+) or negative (−) power;
a fourth lens having negative (−) power; and
a fifth lens having negative (−) power,
wherein the first lens, the second lens, the third lens, the fourth lens, and fifth lens are arranged in order from an object to be formed as an image, the fourth lens is a meniscus-shaped lens having a concave object-side surface in a proximity of an optical axis of the fourth lens and a convex image-side surface in a proximity of the optical axis of the fourth lens, and
a distance tt from a vertex of the first lens at the object side to the image side and an image height (a diagonal length of an effective image surface) 2Y satisfy the following conditional expression:

$0.68 < tt/2Y < 1.05$.

2. The imaging lens unit as set forth in claim 1, wherein an Abbe number v4 of the fourth lens satisfies the following conditional expression:

$0 < v4 < 30$.

3. The imaging lens unit as set forth in claim 1, wherein the second lens and the fourth lens are made of a high dispersion material.

4. The imaging lens unit as set forth in claim 1, wherein an Abbe number v1 of the first lens satisfies the following conditional expression:

$50 < v1$.

5. The imaging lens unit as set forth in claim 1, wherein an Abbe number v2 of the second lens satisfies the following conditional expression:

$0 < v2 < 30$.

6. The imaging lens unit as set forth in claim 1, wherein the first lens has a convex form toward an object side.

7. The imaging lens unit as set forth in claim 1, wherein the second lens has a concave form toward the image side.

8. The imaging lens unit as set forth in claim 1, wherein the fifth lens has an inflection point toward the image side.

9. The imaging lens unit as set forth in claim 1, wherein the third lens has negative (−) power.

10. The imaging lens unit as set forth in claim 1, wherein the third lens has positive (+) power.

11. The imaging lens unit as set forth in claim 1, further comprising an aperture stop disposed in front of the first lens to adjust a light amount.

12. The imaging lens unit as set forth in claim 1, further comprising an aperture stop disposed between the first lens and the second lens to adjust a light amount.

13. The imaging lens unit as set forth in claim 1, wherein the first lens, the second lens, the third lens, and the fourth lens are all made of a plastic material.

14. The imaging lens unit as set forth in claim 1, wherein a curvature radius r7 of the fourth lens at the object side, and a curvature radius r8 of the fourth lens at the image side satisfy the following conditional expression:

$(r7+r8)/(r7−r8) < −2.5$.

15. The imaging lens unit as set forth in claim 1, wherein a total focal length f of the imaging lens unit and a distance tt from a vertex of the first lens at the object side to the image side satisfy the following conditional expression:

$0 < tt/f < 1.3$.

16. The imaging lens unit as set forth in claim 1, wherein an Abbe number v1 of the first lens, an Abbe number v2 of the second lens, an Abbe number v3 of the third lens, and an Abbe number v4 of the fourth lens satisfy the following conditional expression:

$0.7 < (v1+v2)/(v3+v4) \le 1.2$.

17. The imaging lens unit as set forth in claim 1, wherein the sum f12 of focal lengths of the first lens and the second lens and a total focal length f of the imaging lens unit satisfy the following conditional expression:

$0.7 < f12/f < 1.4$.

18. The imaging lens unit as set forth in claim 1, wherein a focal length f2 of the second lens and a total focal length f of the imaging lens unit satisfy the following conditional expression:

$-1.6 < f2/f < -0.8$.

19. The imaging lens unit as set forth in claim 1, wherein a curvature radius r4 of the second lens at the image side and a total focal length f of the imaging lens unit satisfy the following conditional expression:

$0.3 < r4/f < 1.0$.

20. The imaging lens unit as set forth in claim 1, wherein a refractive index n2 of the second lens satisfies the following conditional expression:

$1.58 < n2 < 1.75$.

21. The imaging lens unit as set forth in claim 1, wherein a distance d456 from the second lens at the image side to the fourth lens at the object side on the optical axis and a total focal length f of the imaging lens unit satisfy the following conditional expression:

$0.6 < d456/f < 1.6$.

22. The imaging lens unit as set forth in claim 1, wherein an Abbe number v1 of the first lens and an Abbe number v2 of the second lens satisfy the following conditional expression:

$25 < v1-v2 < 40$.

23. The imaging lens unit as set forth in claim 1, wherein a semi-angle of view (a maximum angle of light incident to an optical system) ω satisfies the following conditional expression:

$29 \le \omega \le 39$.

24. The imaging lens unit as set forth in claim 1, wherein a distance TTL from an incident surface of the first lens at the object side to the image side and a total focal length F of the imaging lens unit satisfy the following conditional expression:

$1.0 \le TTL/f \le 1.3$.

25. The imaging lens unit as set forth in claim 1, wherein a curvature radius r1 of the first lens at the image side and a total focal length f of the imaging lens unit satisfy the following conditional expression:

$0.3 < r1/f < 0.45$.

26. The imaging lens unit as set forth in claim 1, wherein a total focal length f of the imaging lens unit and a focal length f5 of the fifth lens satisfy the following conditional expression:

$-0.8 < f/f5 < 0.02$.

* * * * *